US009441135B2

(12) United States Patent
Klun et al.

(10) Patent No.: US 9,441,135 B2
(45) Date of Patent: *Sep. 13, 2016

(54) ADDITIVE COMPRISING LOW SURFACE ENERGY GROUP AND HYDROXYL GROUPS AND COATING COMPOSITIONS

(71) Applicant: 3M INNOVATIVE PROPERTIES COMPANY, St. Paul, MN (US)

(72) Inventors: Thomas P. Klun, Lakeland, MN (US); Mahfuza B. Ali, Mendota Heights, MN (US); Richard J. Pokorny, Maplewood, MN (US); Daniel R. Cremons, North Oaks, MN (US); Michelle L. Toy, North St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/381,382

(22) PCT Filed: May 30, 2013

(86) PCT No.: PCT/US2013/043306
§ 371 (c)(1),
(2) Date: Aug. 27, 2014

(87) PCT Pub. No.: WO2013/191861
PCT Pub. Date: Dec. 27, 2013

(65) Prior Publication Data
US 2015/0126654 A1 May 7, 2015

Related U.S. Application Data

(60) Provisional application No. 61/661,547, filed on Jun. 19, 2012.

(51) Int. Cl.
| | | |
|---|---|---|
| C08F 22/10 | (2006.01) | |
| C09D 133/16 | (2006.01) | |
| C09D 4/00 | (2006.01) | |
| C09D 5/00 | (2006.01) | |

(52) U.S. Cl.
CPC ............. C09D 133/16 (2013.01); C08F 22/10 (2013.01); C09D 4/00 (2013.01); C09D 5/00 (2013.01)

(58) Field of Classification Search
USPC .......................................... 524/546; 526/247
See application file for complete search history.

(56) References Cited

U.S. PATENT DOCUMENTS

| | | |
|---|---|---|
| 2,732,398 A | 1/1956 | Brice |
| 2,803,613 A | 8/1957 | Kather |
| 2,803,615 A | 8/1957 | Ahlbrecht |
| 3,159,662 A | 12/1964 | Ashby |
| 3,220,972 A | 11/1965 | Lamoreaux |
| 3,250,808 A | 5/1966 | Moore |
| 3,410,886 A | 11/1968 | Joy |
| 3,544,537 A | 12/1970 | Brace |
| 3,553,179 A | 1/1971 | Bartlett |
| 3,718,631 A | 2/1973 | Grosmangin |
| 4,013,615 A | 3/1977 | Ohashi |
| 4,262,072 A | 4/1981 | Wendling |
| 4,557,751 A | 12/1985 | Ronning |
| 4,609,574 A | 9/1986 | Keryk |
| 4,654,233 A | 3/1987 | Grant |
| 4,728,571 A | 3/1988 | Clemens |
| 4,855,184 A | 8/1989 | Klun |
| 4,916,169 A | 4/1990 | Boardman |
| 5,145,886 A | 9/1992 | Oxman |
| 5,173,363 A | 12/1992 | Fitch |
| 5,581,905 A | 12/1996 | Huelsman |
| 5,648,407 A | 7/1997 | Goetz |
| 5,677,050 A | 10/1997 | Bilkadi |
| 5,694,701 A | 12/1997 | Huelsman |
| 5,804,625 A * | 9/1998 | Temperante ............ A61L 15/24 524/188 |
| 5,882,774 A | 3/1999 | Jonza |
| 6,019,997 A | 2/2000 | Scholz |
| 6,134,808 A | 10/2000 | Yapel |
| 6,174,964 B1 | 1/2001 | Jariwala |
| 6,224,949 B1 | 5/2001 | Wright |
| 6,299,799 B1 | 10/2001 | Craig |
| 6,368,699 B1 | 4/2002 | Gilbert |
| 6,376,590 B2 | 4/2002 | Kolb |
| 6,562,360 B2 | 5/2003 | Scholz |
| 6,664,354 B2 | 12/2003 | Savu |
| 6,893,731 B2 | 5/2005 | Kausch |
| 6,995,222 B2 | 2/2006 | Buckanin |
| 7,094,829 B2 | 8/2006 | Audenaert |
| 7,098,429 B2 | 8/2006 | Angermann |
| 7,153,563 B2 | 12/2006 | Shoshi |
| 7,192,795 B2 | 3/2007 | Boardman |
| 7,241,437 B2 | 7/2007 | Davidson |
| 7,439,279 B2 | 10/2008 | Kondo |
| 7,718,264 B2 | 5/2010 | Klun |
| 8,137,807 B2 | 3/2012 | Clapper |
| 8,138,275 B2 | 3/2012 | Jung |
| 8,742,022 B2 | 6/2014 | Pokorny |
| 2003/0012936 A1 | 1/2003 | Draheim |
| 2003/0217806 A1 | 11/2003 | Tait |
| 2004/0071974 A1* | 4/2004 | Shoshi ..................... C08J 7/047 428/421 |

(Continued)

FOREIGN PATENT DOCUMENTS

| | | |
|---|---|---|
| CN | 1490361 | 4/2004 |
| CN | 2004/0071974 | 3/2007 |

(Continued)

OTHER PUBLICATIONS

Griffin, "Calculation of HLB Values of Non-Ionic Surfactants", Journal of the Society of Cosmetic Chemists. 1954, Vo. 5, pp. 249-259.

(Continued)

*Primary Examiner* — Peter D Mulcahy
*Assistant Examiner* — Henry Hu

(57) ABSTRACT

Coating compositions are described comprising a non-ionic surfactant and an additive wherein the additive comprises a low surface energy group and one or more hydroxyl groups. The cured coating can exhibit reduced fingerprint visibility and low cellulose surface attraction. Also described are copolymer compositions useful as additives.

15 Claims, 2 Drawing Sheets

(56) References Cited

U.S. PATENT DOCUMENTS

| | | |
|---|---|---|
| 2004/0077775 A1 | 4/2004 | Audenaert |
| 2004/0184150 A1 | 9/2004 | Johnson |
| 2005/0137355 A1* | 6/2005 | Buckanin ............ C09D 133/16 525/374 |
| 2005/0142362 A1 | 6/2005 | Inaoka |
| 2005/0249940 A1 | 11/2005 | Klun |
| 2005/0250921 A1 | 11/2005 | Qiu |
| 2007/0125451 A1 | 6/2007 | Smith |
| 2007/0149650 A1 | 6/2007 | Masuda |
| 2008/0160231 A1 | 7/2008 | Newington |
| 2010/0016452 A1 | 1/2010 | Nedwed |
| 2010/0035053 A1 | 2/2010 | Kishi |
| 2010/0160595 A1 | 6/2010 | Klun |
| 2010/0173166 A1 | 7/2010 | Dams et al. |
| 2010/0296049 A1 | 11/2010 | Justynska |
| 2010/0310875 A1 | 12/2010 | Hao |
| 2012/0088090 A1 | 4/2012 | Miyazaki |
| 2012/0154811 A1* | 6/2012 | Pokorny ............ C08F 220/24 356/432 |
| 2012/0219782 A1 | 8/2012 | Lee |
| 2012/0270980 A1* | 10/2012 | Pokorny ............ C09D 5/1618 524/317 |
| 2014/0212651 A1 | 7/2014 | Pokorny |

FOREIGN PATENT DOCUMENTS

| | | |
|---|---|---|
| EP | 1311637 | 5/2003 |
| EP | 2042340 | 4/2009 |
| JP | 9-67417 | 3/1997 |
| JP | 2007-262286 | 10/2007 |
| JP | 2010-90235 | 4/2010 |
| JP | 2010-241987 | 10/2010 |
| JP | 2011-037263 | 2/2011 |
| JP | 2012-106186 | 6/2012 |
| KR | 2002-0054756 | 7/2002 |
| KR | 2004-0087534 | 10/2004 |
| WO | WO 95-17303 | 6/1995 |
| WO | WO 99-39224 | 8/1999 |
| WO | WO 2006-102383 | 9/2006 |
| WO | WO 2008-067262 | 6/2008 |
| WO | WO-2008/067262 A1 * | 6/2008 |
| WO | WO 2009-029438 | 3/2009 |
| WO | WO 2009-032988 | 3/2009 |
| WO | WO 2009-076389 | 6/2009 |
| WO | WO 2009-090803 | 7/2009 |
| WO | WO 2009-148765 | 12/2009 |
| WO | WO 2010-053729 | 5/2010 |
| WO | WO 2011-034387 | 3/2011 |
| WO | WO 2012-087661 | 6/2012 |
| WO | WO 2013-191822 | 12/2013 |

OTHER PUBLICATIONS

Brunauer, "Adsorption of Gases in Multimolecular Layers", Contribution from the Bureau of Chemistry and Soils and George Washington University, Feb. 1938, vol. 60, pp. 309-319.
Sing, "Reporting Physisorption Data for Gas/Solid Systems with Special Reference to the Determination of Surface Area and Porosity", International Union of Pure and Applied Chemistry, IUPAC Publication, 1985, vol. 57, No. 4, pp. 603-619.
Ferguson, "Preparation, characterization and use in emulsion polymerization of acrylated alkyl ethoxylate surface-active monomers", Polymer, 1993, vol. 34, No. 15, pp. 3281-3292.
Davies, "A Quantitative Kinetic Theory of Emulsion Type. I. Physical Chemistry of the Emulsifying Agent", University Lecturer in Chemical Engineering, Cambridge, 1957, pp. 426-438.
Gutoff, "Coating and Drying Defects" Troubleshooting Operating Problems, (2001), 7 pages.
"Composition of Fingerprint Secretions", FIO Study Guides, undated, pp. 1-17.
International Search Report for PCT International Application No. PCT/US2013/043306 mailed on Sep. 16, 2013, 4 pages.
IUPAC Publication "Reporting Physisorption Data for Gas/Solid Systems with Special Reference to the Determination of Surface Area and Porosity", Pure & Applied Chemistry, vol. 57, No. 4, pp. 603-619, 1985.
Partial International Search PCT/US2011/064606 Mar. 26, 2012, 2 pgs.
International Search Report PCT/US2011/064606, Jul. 6, 2012, 7 pages.

* cited by examiner

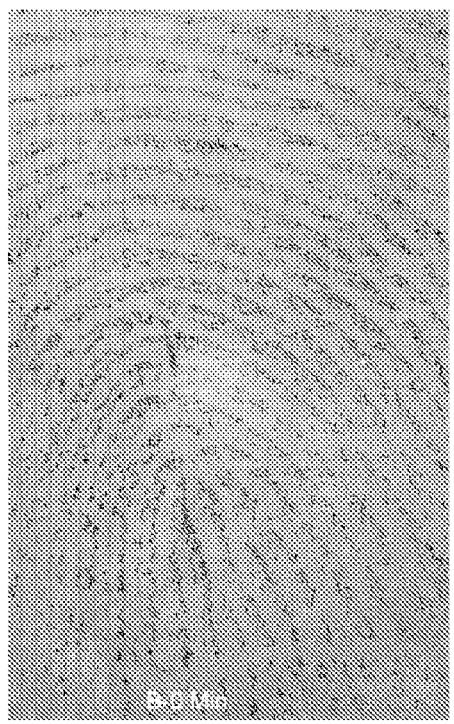 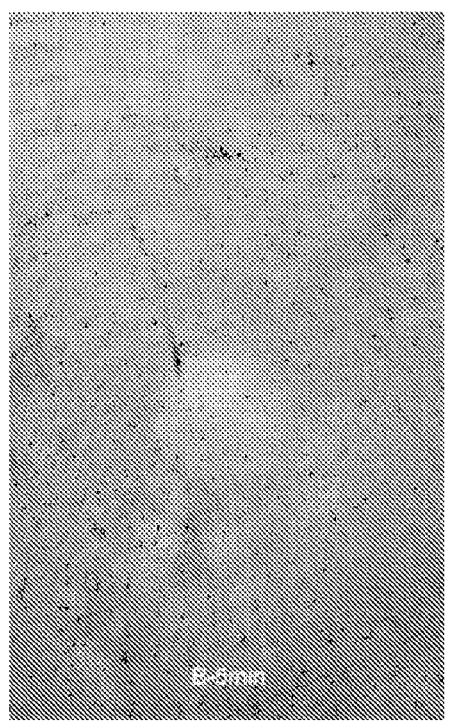
*FIG. 1A*  *FIG. 1B*
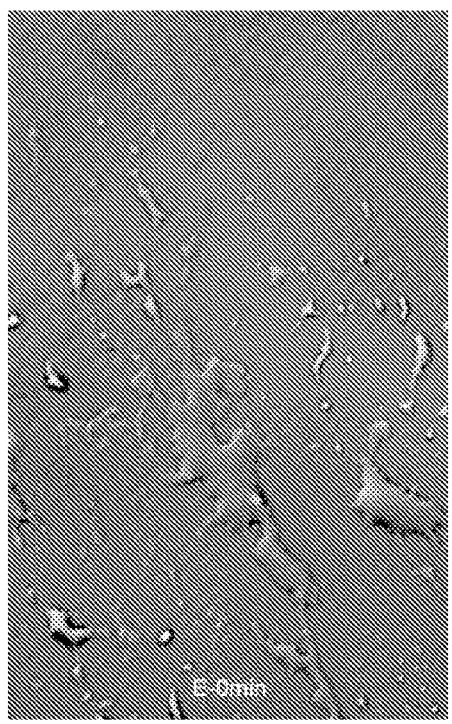 
*FIG. 2A*  *FIG. 2B*

ADDITIVE COMPRISING LOW SURFACE ENERGY GROUP AND HYDROXYL GROUPS AND COATING COMPOSITIONS

CROSS REFERENCE TO RELATED APPLICATIONS

This is a national stage filing under 35 U.S.C. 371 of PCT/US2013/043306, filed May 30, 2013, which claims priority to U.S. Provisional Application No. 61/661,547, filed Jun. 19, 2012, the disclosure of which is incorporated by reference in their entirety herein.

BACKGROUND OF THE INVENTION

WO2008/067262 describes optical substrates having a surface layer that comprises the reaction product of a polymerizable mixture comprising at least one perfluoropolyether material comprising at least two free-radically polymerizable groups and at least one segment with greater than 6 ethylene oxide repeat units; and at least one non-fluorinated binder precursor comprising at least two free-radically polymerizable groups.

U.S. Pat. No. 7,153,563 describes a hard coat film comprising a substrate film and a hard coat layer disposed at least on one face of the substrate film, wherein the hard coat layer comprises 100 parts by weight of (A) a resin of an ionizing radiation curing type and 0.1 to 10 parts by weight of (B) a non-ionic surfactant. The hard coat film is used for protection of surfaces such as the surface of touch panels and displays. Attachment of fingerprints during input operations by fingers on the surfaces is suppressed and the attached fingerprints can be easily wiped out. Scratch resistance and wear resistance of conventional hard coat films are retained.

As described in the "Description of Related Art" in U.S. Pat. No. 7,153,563, to provide the property of preventing attachment of dirt and removing the attached dirt, it is frequently conducted that a silicone-based compound or a fluorine-based compound is added to conventional hard coat films having a hard coat layer which is formed and supported on a substrate film by curing by heating or with an ionizing radiation. However, the highly water-repellent surface obtained above does not always suppress the attachment of fingerprints and the attached fingerprints are more clearly visible. Conventional hard coat films have a drawback in that fingerprints are attached on the films after input operations with fingers and the attached fingerprints are not easily wiped out.

Certain fluorinated additives have been found to provide low lint attraction, as determined by use of a Cellulose Surface Attraction Test, as described in WO2008/067262 and WO2009/076389.

Certain silicone additives have also been found to provide low lint attraction as described in WO 2009/029438. Such silicone (meth)acrylate additives generally comprise a polydimethylsiloxane (PDMS) backbone and at least one alkoxy side chain terminating with a (meth)acrylate group. The alkoxy side chain may optionally comprise at least one hydroxyl substituent. Such silicone (meth)acrylate additives are commercially available from various suppliers such as Evonik under the trade designations "TEGO Rad".

US Patent Application Publication No. US2012/0154811 describes coating compositions comprising non-ionic surfactant and "TEGO Rad 2100". In addition to low lint attraction, such cured coatings also exhibit a property of an initially visible simulated fingerprint reducing in visibility after a duration of time. However, as evident by Examples 34-45 of US Patent Application Publication No. US2012/0154811, as the lint attraction decreases (low cellulose surface attraction), the fingerprint visibility ratio increases. Thus, industry would find advantage in coating combinations that can provide a combination of low lint attraction and low fingerprint visibility.

SUMMARY OF THE INVENTION

Presently are described coating compositions comprising a non-ionic surfactant and an additive wherein the additive comprises a low surface energy group and one or more hydroxyl groups. The cured coating can exhibit reduced fingerprint visibility and low cellulose surface attraction. Also described are copolymer compositions useful as additives.

In some embodiments, a coating composition is described comprising a polymerizable resin composition; a non-ionic unpolymerizable surfactant having an hydrophilic lipophilic balance ranging from 2 to 6 and optionally a polymerizable surfactant wherein the surfactants are present at a concentration of greater than 10 wt-% to 25 wt-% solids; and an additive. In one embodiment, the additive comprises a low surface energy group and one or more hydroxyl groups with the proviso that the additive does not consist of an additive having a polydimethylsiloxane backbone and a hydroxyl substituted side chain terminating with an acrylate group. In another embodiment, the additive comprises a low surface energy group and hydroxyl groups wherein at least a portion of the hydroxyl groups are primary hydroxyl groups. The low surface energy group generally comprises a fluorinated or silicone moiety.

In other embodiments, copolymer compositions that are useful as additives are described. In one embodiment, the additive has the general formula:

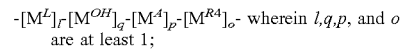
-[M$^L$]$_l$-[M$^{OH}$]$_q$-[M$^A$]$_p$-[M$^{R4}$]$_o$- wherein $l,q,p$, and $o$ are at least 1;

or

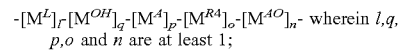
-[M$^L$]$_l$-[M$^{OH}$]$_q$-[M$^A$]$_p$-[M$^{R4}$]$_o$-[M$^{AO}$]$_n$- wherein $l,q, p,o$ and $n$ are at least 1;

wherein
[M$^L$] represent units derived from one or more ethylenically unsaturated monomers comprising a low surface energy silicone or fluororinated group;
[M$^{OH}$] represent units derived from one or more ethylenically unsaturated monomers and at least one hydroxyl group;
[M$^A$] represent units comprising a residue of [M$^{OH}$] and a free-radically polymerizable group;
[M$^{R4}$] represent units derived from one or more ethylenically unsaturated monomers comprising an alkyl group; and
[M$^{AO}$] represents units derived from one or more ethylenically unsaturated monomers having the group R—(O—R$_a$)$_j$ wherein R is an alkyl group having greater than 6, 7, or 8 carbon atoms, Ra is independently an alkylene group C$_x$H$_{2x}$ where x=2 to 4, and j ranges from 1 to 50.

BRIEF DESCRIPTION OF THE DRAWINGS

FIG. 1A is a digital photograph of a human fingerprint applied to a cured coating at a microscope setting of 12× (1.2× objective and a 10× multiplier).

FIG. 1B is a digital photograph of the human fingerprint applied to the cured coating of FIG. 1A five minutes later.

FIG. 2A is a digital photograph of a human fingerprint applied to a cured coating at a microscope setting of 500×.

FIG. 2B is a digital photograph of the human fingerprint applied to the cured coating of FIG. 2A four minutes later.

DETAILED DESCRIPTION AND PREFERRED EMBODIMENTS

Figure 3A:
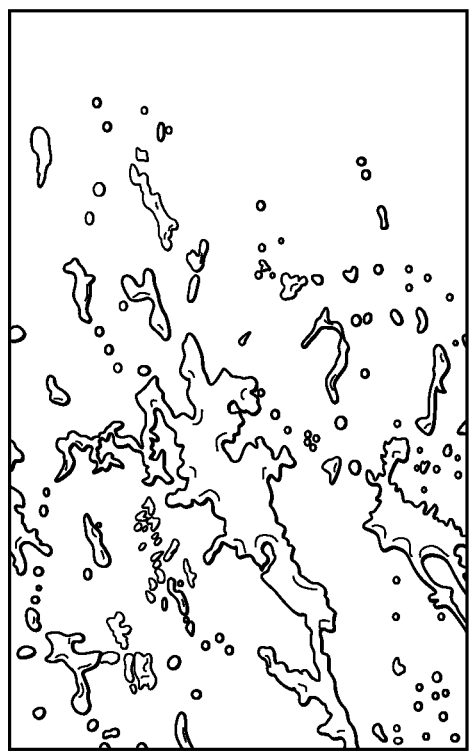
FIGS. 3A and 3B are illustrations of the photographs of FIGS. 2A and 2B respectively.
Figure 3B:
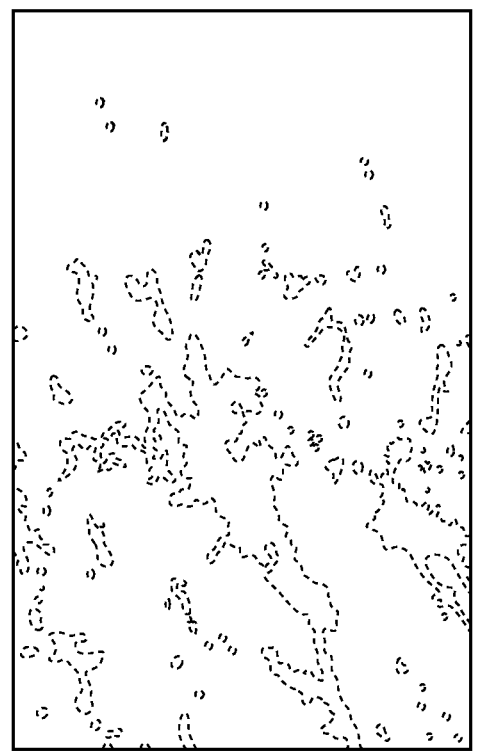

The coating compositions described herein comprise a lipophilic liquid, such as a (e.g. non-ionic) surfactant. Such (e.g. non-ionic) surfactant is typically an unpolymerizable surfactant, meaning that the surfactant is not reacted or copolymerized with the other components of the coating composition. Hence, the (e.g. non-ionic) surfactant is unpolymerized in the cured coating composition. The (e.g. non-ionic) surfactant can also be characterized as "free" surfactant. In some embodiments, the coating compositions further comprise an unpolymerizable surfactant in combination with a polymerizable surfactant.

The coating composition further comprises an additive comprising a low surface energy group, such as a silicone group or a fluorinated group and a hydroxyl group. The inclusion of the (e.g. primary) hydroxyl groups are surmised to provide the low lint attraction, as measured by the Cellulose Surface Attraction Test, described in the forthcoming examples. The cured surface layers preferably have a haze of less than 20%, more preferably less than 10% and even more preferably less than 5%, 4%, 3%, 2%, or 1% according to the Cellulose Surface Attraction Test.

In favored embodiments, the additive further comprises a free-radically polymerizable group (derived from the hydroxyl group) and an alkyl group. In some embodiments, the alkyl group of the additive is a hydrophobic group. In some embodiments, the hydrophobic group of the additive can be derived from a non-ionic surfactant. Unless specified otherwise, the following description pertaining to non-ionic surfactants is applicable to both the unpolymerizable surfactant of the coating composition as well as the surfactant from which the hydrophobic group of the additive can be derived.

Non-ionic surfactants are organic compounds that are amphiphilic, comprising a hydrophobic group (or "tail") and a hydrophilic group (or "head"). Typically surfactant molecules migrate to the surface, where the hydrophobic group may extend out of the bulk coating phase, while the water soluble head group remains in the bulk coating phase. This alignment and aggregation of surfactant molecules at the surface acts to alter the surface properties of the coating.

A surfactant can be classified by the presence of formally charged groups in its head. The head of an ionic surfactant carries a net charge. A non-ionic surfactant has no charged groups in its head.

Surfactants can be characterized by various methodologies. One common characterization method, as known in the art, is the hydrophilic-lipophilic balance ("HLB"). Although various method have been described for determining the HLB of a compound, unless specified otherwise, as used herein HLB refers to the value obtained by the Griffin's method (See Griffin W C: "Calculation of HLB Values of Non-Ionic Surfactants," Journal of the Society of Cosmetic Chemists 5 (1954): 259). The computations were conducted utilizing the software program Molecular Modeling Pro Plus from Norgwyn Montgomery Software, Inc. (North Wales, Pa.).

According to Griffin's method:

$HLB = 20 * Mh/M$ where Mh is the molecular mass of the hydrophilic portion of the molecule, and M is the molecular mass of the whole molecule. This computation provides a numerical result on a scale of 0 to 20, wherein "0" is highly lipophilic.

Griffin's method is typically used to calculate the HLB of a single molecule. However, various (e.g. commercially available) non-ionic surfactants comprise a mixture of molecules. When the surfactant comprises a mixture of molecules, the HLB can be calculated by the summation of the HLBs of the individual molecules multiplied by the weight fraction of each molecule.

A broad range of non-ionic surfactants may be utilized as the starting component in the synthesis of the additive. Without intending to be bound by theory, the additive is believed to act a compatibilizer for the "free" surfactant that is unpolymerized in the cured coating composition. The HLB of surfactants for use as a starting component in the synthesis of the additive may range from 1 to 19. The non-ionic surfactant utilized as the starting component in the synthesis of the additive is typically free of fluorine and silicone atoms.

The unpolymerizable (e.g. non-ionic) surfactant of the coating composition is more lipophilic then hydrophilic, i.e., an HLB less than 10. In favored embodiments, the HLB is at least 2 or 2.5 and no greater than about 6 or 5.5. In some favored embodiments, the coating composition comprises a (e.g. non-ionic) surfactant having an HLB of at least 3, or 3.5, or 4.0. The unpolymerizable (e.g. non-ionic) surfactant of the coating composition is typically not a lipolytic enzyme, such as lipase. Lipolytic enzymes are generally more hydrophilic than lipophilic having an HLB greater than 6. Without intending to be bound by theory it is surmised that the lipophilic group of the surfactant may physically absorb the body oil of a fingerprint.

Such (e.g. non-ionic) surfactants generally comprise an alkyl or alkenyl group having at least 12, or 14, or 16, or 18 carbon atoms. Such relatively long chain alkyl or alkylene group is commonly referred to as a "fatty" group. The number of carbon atoms can be greater than 18 carbon atoms provided the (e.g. non-ionic) surfactant is a liquid at ambient temperature (e.g. 25° C.). The liquid (e.g. non-ionic) surfactant may further comprise up to 20 wt-% of a solid fraction. In some embodiments, the alkyl or alkenyl group has no greater than 24 carbon atoms. In some favored embodiments, such alkyl group is unbranched. The alkyl or alkenyl group may optionally comprise substituents, provided that the (e.g. non-ionic) surfactant is sufficiently lipophilic, e.g. having an HLB as previously described. The unpolymerizable non-ionic surfactant is also typically free of fluorine and silicone atoms.

Surfactants having the preferred HLB range (e.g. by inclusion of a fatty group) are generally non-ionic surfactants. However, other classes of surfactants may also be suitable provided such surfactant is sufficiently lipophilic as described herein.

Various classes of non-ionic surfactants are known including for example fatty alcohols, fatty acids, fatty amines, fatty amides, and derivatives thereof.

In some embodiments, such as for use as a starting compound in the synthesis of the additive, the non-ionic surfactant is a fatty alcohol. Fatty alcohols typically have the general formula

R—OH wherein R is a (e.g. straight or branched chain) alkyl or alkenyl group, as previously described, optionally substituted in available positions by N, O, or S atoms. Various fatty alcohols are known including dodecyl alcohol, cetyl alcohol $CH_3(CH_2)_{15}OH$, stearyl alcohol (also known as octadecyl alcohol or 1-octadecanol), and oleyl alcohol.

In some embodiments, the non-ionic surfactant is a derivative of a fatty alcohol. One favored derivative is a fatty alcohol, ester or derivative thereof comprising repeat units of ethylene oxide and/or repeat units of propylene oxide. Such derivatives may also be referred to as a polyethoxylated and/or polypropoxylated fatty alcohols, esters, or derivatives thereof. Such derivatives are a favored unpolymerizable non-ionic surfactant of the coating composition and can also be utilized as a starting compound in the synthesis of the additive. One illustrative commercially available surfactant of this type is available from Croda as "Brij O2", reported to have an HLB of 4.9. Such polyethoxylated alcohol comprises a mixture of molecules having the general formula $$C_{18}H_{35}(OCH_2CH_2)_nOH$$

If "n" were 1, such structure has a calculated HLB of 3.6. Further, if "n" were 2, such structure has a calculated HLB of 5.4. If "n" were 0, such structure (i.e. oleyl alcohol) has a calculated HLB of 1.1.

In other embodiments, the non-ionic surfactant is a derivative of a fatty acid. Fatty acids typically have the formula $$RC(O)OH$$

where R is a (e.g. straight chain) alkyl or alkenyl group, as previously described One class of fatty acid derivative can be prepared by reacting a fatty acid with a short chain alkyl glycol mono alkyl ether. Illustrative non-ionic surfactants of this type are described in the following table.

| Surfactant | HLB |
|---|---|
| Reaction product of oleic acid and diethylene glycol mono-ethyl ether | 4.7 |
| Reaction product of oleic acid and dipropylene glycol mono-methyl ether | 2.8 |
| Reaction product of oleic acid and triethylene glycol mono-ethyl ether | 6.2 |
| Reaction product of oleic acid and triethylene glycol mono-n-butyl ether | 5.1 |
| Reaction product of oleic acid and 1-methoxy-2-propanol | 2.0 |
| Reaction product of oleic acid and ethylene glycol mono-methyl ether | 3.1 |

Such derivatives having a HLB no greater than 6, as previously described, are also favored unpolymerizable non-ionic surfactants of the coating composition and can also be utilized as a starting compound in the synthesis of the additive. Derivatives having HLB values of 6 or greater can be utilized in the synthesis of the additive.

The molecular weight of the (e.g. free) surfactant is typically at least 150 g/mole and generally no greater than 600 g/mole. In some embodiments, the molecular weight of the surfactant is at least 200 g/mole, 250 g/mole, or 300 g/mole.

The non-ionic surfactant is preferably present in an amount greater than 10 wt-% solids of the coating composition. The term "wt-% solids" refers to the total non-volatile components of the coating composition. In some embodiments, the concentration of non-ionic surfactant is at least 11 wt-% or 12 wt-%. or 13 wt-% or 14 wt-%. In yet other embodiments, the concentration of non-ionic surfactant is 15 wt-%, 16 wt-%, or 17 wt-%. The concentration of the non-ionic surfactant is typically no greater than 25 wt-% and in favored embodiments no greater than 20 wt-%.

In some embodiments, the coating composition further comprises a (e.g. free-radically) polymerizable non-ionic surfactant in combination with the unpolymerized surfactant. In this embodiment, the concentration of polymerizable and unpolymerizable non-ionic surfactant is greater than 10 wt-% solids of the coating composition and typically no greater than 30 wt-%, or 25 wt-%, 20 wt-%. The inclusion of a (e.g. free-radically) polymerizable non-ionic surfactant is amenable to compatibilizing the free surfactant. The inclusion of such can provide higher concentrations of free surfactant in combination with lower haze (as compared to the same concentration of free surfactant without a polymerizable surfactant). The (e.g. free-radically) polymerizable non-ionic surfactant may be present in the coating composition at a concentration of at least 1, or 2, or 3 wt-%. In some embodiments, the concentration of (e.g. free-radically) polymerizable non-ionic surfactant is no greater than the concentration of free surfactant. In some embodiments, the weight ratio of free surfactant to polymerizable surfactant is at least 1.5:1 or 2:1.

Polymerizable surfactants have been described in the art. A non-ionic surfactant comprising a (meth)acrylate group can be formed by reacting the hydroxyl group of the previously described fatty alcohol derivatives with a (meth) acrylic acid or a (meth)acryloyl halide, or functional (meth) acrylate compound such as an isocyanato-functional (meth) acrylate compound. Replacing a single hydroxyl group with a (meth)acrylate group typically does not significantly change the HLB. Thus, the HLB of the polymerizable surfactant is about the same as the HLB of the unpolymerizable surfactant from which the polymerizable surfactant was derived. In some embodiments, the polymerizable surfactant has an HLB ranging from 2 to 13.

A polymerizable surfactant generally comprises a hydrophobic group, a hydrophilic group and a (free-radically) polymerizable group. In some embodiments, the polymerizable surfactant has the general formula:

$$R(OCH_2CH_2)_nOC(O)—C(R^6)H=CH_2$$

wherein R is a fatty group, as previously described, and n is the number of ethylene oxide repeat units, and $R^6$ is hydrogen or alkyl having from 1 to 4 carbon atoms. In some embodiments, n is at least 1, 2, or 3 and on average is no greater than 20, 19, 18, 17, 16, 15, 14, 13, 12, or 10. In some embodiments, the polymerizable surfactant comprises a mixture of molecules wherein n is 1 and n is 2. In some embodiments R is an alkyl group having at least 12, or 14, or 16, or 18 carbon atoms.

Polymerizable surfactants of this type may be obtained by reaction of a polyethoxylated alcohol, $R(OCH_2CH_2)_nOH$, with an (meth)acryloyl acid chloride, methacrylic or acrylic acid, or a (meth)acrylic anhydride.

In some embodiments, the polymerizable surfactant has the general formula:

$$R(OCH_2CH_2)_nOC(O)N(H)—CH_2-Q-[O—C(O)C(R^6)H=CH_2]_z$$

wherein R is a fatty group, as previously described, Q is a connecting group having a valency of at least 2, $R^6$ is hydrogen or alkyl having from 1 to 4 carbon atoms, and z is 1 or 2.

Polymerizable surfactants of this type may be obtained by reaction of an isocyantoalkyl (meth)acrylates, such as isocyanatoethyl acrylate, isocyanatoethyl methacrylate, or 1,1- bis(acryloyloxymethyl) ethyl isocyanate, with the polyethoxylated alcohol, $R(OCH_2CH_2)_nOH$.

The coating composition described herein comprises an additive comprising a low surface energy group, such as a silicone or fluorinated group and hydroxyl groups. The additive may be present in an amount of at least 0.01, or 0.05, or 0.10, or 0.20, or 0.30, or 0.5 wt-% solids ranging up to about 10 wt-% solids of the coating composition. In some embodiments, the concentration of additive is no greater than about 5 wt-%, 4 wt-% or 3 wt-% or 2 wt-% or 1 wt-% solids of the coating composition.

In some embodiments, the inclusion of the additive provides lower fingerprint visibility as a function of time at the same surfactant concentration. In this embodiment, the coating composition further comprising the additive may have the same non-ionic surfactant concentration as previously described. The additive may also allow for higher concentrations of the non-ionic surfactant with lower haze.

In other embodiments, lower fingerprint visibility as a function of time may be achieved with lower concentrations of surfactant by inclusion of the additive. In this embodiment, the concentration of surfactant may be lower than 10 wt-%. For example, the minimum concentration of non-ionic surfactant may be 5 wt-%, or 6 wt-%, or 7 wt-%, or 8 wt-%, or 9 wt-%. However in favored embodiments, the coating composition comprises greater than 10 wt-% of non-ionic surfactant in combination with an additive having a hydroxyl group and a low surface energy group, such as a silicone group or fluorinated group.

The visibility of a fingerprint initially or as a function of time can be determined by various methods. Preferably, however, such assessment is made using a reproducible standardized method. One method of determining the fingerprint visibility of a coating composition comprises providing a coating composition on a substrate, applying a simulated fingerprint composition onto the coated substrate, and measuring an optical property of the simulated fingerprint composition on the coated substrate. If the measured optical property is for example transmission or haze, the substrate to which the coating composition is applied is a light-transmissible (e.g. transparent) substrate. However, if the optical property is for example gloss, the substrate may alternatively be an opaque substrate.

The simulated fingerprint composition is generally a highly lipophilic substance. The simulated fingerprint composition is typically a mixture of a fatty substance that is predominantly a solid at ambient temperature (25° C.) and an oily substance that is predominantly a liquid at ambient temperature (25° C.). Vegetable shortening is a suitable solid; whereas a fatty alkyl oxide wherein the alkyl group has at least 24 carbon atoms, such as available from Sigma under the trade designation "Triolein", is a suitable liquid. The simulated fingerprint may be applied to the (i.e. cured) coating using a variety of techniques. The oily substance may be diluted with for example a (e.g. alcohol) solvent in order to reduce the viscosity and evenly apply a thin coating (e.g. a thickness of 1.2 microns). A rubber stopper can conveniently be used to provide a continuous coating. However, other rubber stamp designs, or a sandpaper roughened rubber stopper or surface could be utilized to provide a discontinuous coating.

For embodiments wherein the coating composition is a polymerizable composition, the coating composition is cured prior to applying the simulated fingerprint. For embodiments wherein the coating composition comprises a solvent, the coating composition is dried prior to applying the simulated fingerprint.

The optical property, such as haze may be measured initially and after a duration of time. The duration of time may be 1, 2, 3, 4, or 5 minutes or longer durations of times, such as 20 minutes. One suitable method for determining fingerprint visibility is described in greater detail in the forthcoming examples.

By comparing the initial (e.g. simulated) fingerprint visibility to the visibility after a duration of time (e.g. 20 minutes), one can calculate a ratio by dividing the visibility after a duration of time by the initial visibility. When the ratio is 1, there is no change in the visibility of a (e.g. simulated) fingerprint as a function of time. As the ratio, becomes smaller, the change is visibility (i.e. fading of the fingerprint) become greater. In some embodiments, the cured coating described herein exhibits a ratio of simulated fingerprint visibility after a duration of time (e.g. at 20 minutes) to initial simulated fingerprint visibility of less than 0.80, or 0.70, or 0.60, or 0.50.

The visibility of an actual or simulated fingerprint initially or as a function of time can also be determined by use of visible inspection. For example, with reference to FIG. 1A and FIG. 1B, the visibility of a fingerprint can be captured by use of a microscope equipped with a digital camera, using various magnifications. With reference to FIG. 1A, a fingerprint is initially highly visible at a magnification of for example 12×. However, with reference to FIG. 1B, this same fingerprint is substantially less visible after a duration of time (e.g. 5 minutes). With reference to FIG. 2A, at an even high magnification of for example 500×, oil droplets of the fingerprint are initially evident on the cured coating surface. However, with reference to FIG. 2B, these oil droplets are not evident after a duration of time (e.g. 4 minutes), surmised to be absorbed by the cured coating composition.

In favored embodiments described herein, the cured coating maintains its properties and in particular the property of exhibiting reduced fingerprint visibility after aging for 500 hours at 80° C. In some embodiments, the ratio may increase. However, the ratio is still less than 0.80, or 0.70, or 0.60, or 0.50.

The silicone group or fluorinated group of the additive generally lowers the surface energy of the coating composition and thus may be characterized as a low surface energy group.

The cured surface layer and coated articles may exhibit "ink repellency" when ink from a pen, commercially available under the trade designation "Sharpie", beads up into discrete droplets and can be easily removed by wiping the exposed surface with tissues or paper towels, such as tissues available from the Kimberly Clark Corporation, Roswell, Ga. under the trade designation "SURPASS FACIAL TISSUE."

A surface comprising the cured coating described herein preferably exhibits a high advancing contact angle with water of at least 70 degrees. More preferably, the advancing contact angle with water is at least 80 degrees and more preferably at least 90 degrees. Cured coating compositions described herein can exhibit high advancing contact angles with water. The surface comprising the cured coating described herein preferably exhibits a receding contact angle with hexadecane of at least 40, 45 or 50 degrees and typically no greater than 60 degrees.

The additive will be described herein with respect to monomers comprising at least one (meth)acrylate group. However, it is appreciated that other (meth)acryl, free-radically polymerizable, and ethylenically unsaturated functional groups (i.e. polymerizable carbon-carbon double bond) could be employed in place of the described (meth)

acrylate groups. Free-radically polymerizable groups include for example (meth)acryl groups such as (meth) acrylamides, —SH, allyl, or vinyl and combinations thereof.

The additive is generally prepared by polymerizing three or more ethylenically unsaturated monomers wherein at least one of such monomers has a low surface energy (terminal) group, at least one second monomer comprises one or more (e.g. primary) hydroxyl groups, and at least one third monomer comprises a (terminal) alkyl group that may be a hydrophobic group. The additive also typically comprises the residue of at least one initiator and chain transfer agent as known in the art.

At least one free-radical initiator is typically utilized for the preparation of the polyacrylate copolymer additive. Useful free-radical thermal initiators include, for example, azo, peroxide, persulfate, and redox initiators, and combinations thereof. Useful free-radical photoinitiators include, for example, those known as useful in the UV cure of acrylate polymers. In some aspects, the copolymer additive is solution polymerized by use of a thermal initiator and then photopolymerized after being combined with the polymerizable resin (e.g. hardcoat).

Although the polymerization method is not particularly limited, the additive is typically prepared via solution polymerization in a (e.g. non-fluorinated) dilute solution with organic solvent. A single organic solvent or a blend of solvents can be employed.

The additive is typically prepared in a two-step process that comprises forming a polymeric intermediate by free-radically polymerizing:

i) at least one low surface energy (silicone, perfluoroalkyl, perfluoropolyether) monomer comprising at least one ethylenically unsaturated (e.g. (meth)acrylate) group;

ii) at least one monomer comprising at least one ethylenically unsaturated (e.g. (meth)acrylate) group and one or more hydroxyl groups; and iii) at least one monomer comprising at least one ethylenically unsaturated (e.g. (meth)acrylate) group and an alkyl group.

In some embodiments, the monomers of i), ii), and iii) are monofunctional monomers, having a single ethylenically unsaturated (e.g. (meth)acrylate or thiol) group.

In the two-step method a portion of the hydroxyl groups of ii) are subsequently reacted to convert a portion of the hydroxyl group to an ethylenically unsaturated (e.g. (meth) acrylate) group. For example, the hydroxyl group can be reacted with an isocyanatoalkyl(meth)acrylate converting the hydroxyl group to a urethane linkage. Alternatively, the hydroxyl group can be reacted with acryloyl chloride or methacrylic anhydride.

The molecular weight of the additive may also be controlled by adding a suitable chain transfer agent. Chain transfer agents can be used to promote chain termination and limit gel formation. Useful chain transfer agents include, for example, thiols, and polyhalocarbons. Examples of commercially available chain transfer agents include tetrabromomethane, 1-hexanethiol, 1-heptanethiol, 1-octanethiol, 1-nonanethiol, 1-decanethiol, 1-dodecanethiol, 1-octadecyl mercaptan, 1-pentadecanethiol, 1-hexadecyl mercaptan, tert-nonyl mercaptan, tert-hexadecyl mercaptan, tert-tetradecyl mercaptan, 1H,1H,2H,2H-perfluorohexanethio, and 1H,1H,2H,2H-perfluorododecyl-1-thiol; as well as thio terminated poly(organosiloxane) (e.g. "KF-2001"). Such chain transfer agents can also provide the (e.g. hydrophobic) alkyl group of the copolymer additive and/or the low surface energy group of the copolymer additive.

The copolymer additive reaction product is surmised to comprise a mixture of unreacted monomeric starting material, oligomeric species, and polymeric species having each of requisite monomeric units.

When the ethylenically unsaturated groups of the starting monomers are (meth)acrylate groups, the additive comprises a polyacrylate backbone. However, the backbone of the forthcoming polyacrylate units may alternatively comprise other free-radically polymerized groups, as previously described.

The polyacrylate additive comprises at least one low surface energy group having the general formula:

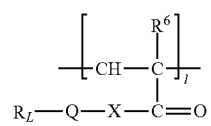

wherein $R_L$ is low surface energy silicone or fluorinated group;

Q is a connecting group having a valency of at least 2;

X is O, S, or $NR^5$, where $R^5$ is H or lower alkyl of 1 to 4 carbon atoms, and $R^6$ is hydrogen or alkyl having from 1 to 4 carbon atoms (e.g., methyl, ethyl, n-propyl, isopropyl, n-butyl, isobutyl, or sec-butyl).

Q can comprise a bond or a straight chain, branched chain, or cyclic-containing connecting group. Q can include an alkylene, an arylene, an aralkylene, an alkarylene. Q can optionally include heteroatoms such as O, N, and S, and combinations thereof. Q can also optionally include a heteroatom-containing functional group such as carbonyl or sulfonyl, and combinations thereof.

When the low surface energy group is a silicone group, the silicone group is typically derived from an organosiloxane. Preferred silicon-containing resins are organopolysiloxanes. Organopolysiloxanes are known in the art and are described for example in U.S. Pat. No. 3,159,662 (Ashby); U.S. Pat. No. 3,220,972 (Lamoreauz); U.S. Pat. No. 3,410,886 (Joy); U.S. Pat. No. 4,609,574 (Keryk); U.S. Pat. No. 5,145,886 (Oxman, et. al); U.S. Pat. No. 4,916,169 (Boardman et. al); and U.S. Pat. No. 7,192,795 (Boardman et. al).

Suitable polyorganosiloxanes include linear, cyclic or branched organosiloxanes of the formula:

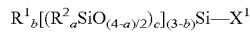

wherein $R^1$ is a monovalent, straight-chained, branched or cyclic, unsubstituted or substituted hydrocarbon group containing from 1 to 18 carbon atoms; $R^2$ is independently a monovalent hydrocarbon group from 2 to 10 carbon atoms; $X^1$ is $-(CH_2)_d-Y$ where Y is $-OH$, $-SH$, $-NH_2$, or $-NHR^3$, where d=0-10, and $R^3$ is a lower alkyl or cycloalkyl of 1 to 6 carbon atoms; each a is independently 0, 1, 2 or 3; b is 0, 1 or 2; and c is 5 to 300. In some embodiments, $R^2$ is methyl.

$R^1$ is typically an alkyl group such as methyl, ethyl, n-propyl, iso-propyl, n-butyl, iso-butyl, tert-butyl, n-pentyl, iso-pentyl, neo-pentyl, tert-pentyl, cyclopentyl, n-hexyl, cyclohexyl, n-octyl, 2,2,4-trimethylpentyl, n-decyl, n-dodecyl, and n-octadecyl; aromatic groups such as phenyl or naphthyl; alkaryl groups such as 4-tolyl; aralkyl groups such as benzyl, 1-phenylethyl, and 2-phenylethyl; and substituted alkyl groups such as 3,3,3-trifluoro-n-propyl, 1,1,2,2-tetrahydroperfluoro-n-hexyl, and 3-chloro-n-propyl.

Preferably polyorganosiloxanes are linear organosiloxanes of the formula

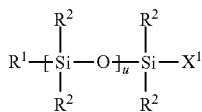

wherein $R^1$, $R^2$; and $X^1$ are the same as just described and u is 5 to 300.

In some embodiments, the polyacrylate additive composition comprises a unit represented by the formula:

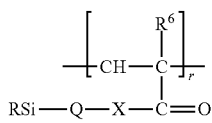

wherein RSi is $R^1{}_b[(R^2{}_aSiO_{(4-a)/2})_c]_{(3-b)}Si-$ (as described above),
Q is $-(CH_2)_d-$ (as described above),
X is O, S, $NR^5$ where $R^5$ is H or a lower alkyl of 1 to 4 carbon atoms, and
$R^6$ is hydrogen or alkyl having from 1 to 4 carbons.

In some embodiments, the additive composition comprises a thio unit represented by the formula:

[RSi-Q-S]$_t$— wherein RSi and Q are the same as just described and S is sulfur.

Various fluorinated low surface energy groups are known including perfluoroalkyl groups and perfluoropolyether groups.

In some embodiments, the additive comprises a perfluoroalkyl group. The term "perfluoroalkyl group" includes alkyl groups in which all C—H bonds are replaced by C—F bonds as well as groups in which one hydrogen is present replacing a terminal fluorine atom. In some embodiments of perfluoroalkyl groups, when at least one hydrogen is present, the perfluoroalkyl group includes at least one difluoromethyl group. Suitable perfluoroalkyl groups comprise 3 to 12 (i.e., 3, 4, 5, 6, 7, 8, 9, 10, 11, or 12) carbon atoms.

In some embodiments, the polyacrylate additive composition comprises a unit represented by the formula:

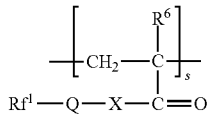

wherein $Rf^1$ is a perfluoroalkyl containing group, X is O, S, or $NR^5$, where $R^5$ is H or a lower alkyl of 1 to 4 carbon atoms, Q is a connecting group having a valency of at least 2 as previously described and $R^6$ is hydrogen or alkyl, as previously described.

In some embodiments, each $Rf^1$ is independently a perfluoroalkyl group having from 3 to 6 (e.g., perfluoro-n-hexyl, perfluoro-n-pentyl, perfluoroisopentyl, perfluoro-n-butyl, perfluoroisobutyl, perfluoro-sec-butyl, perfluoro-tert-butyl, perfluoro-n-propyl, or perfluoroisopropyl). In some embodiments, $Rf^1$ is perfluorobutyl (e.g., perfluoro-n-butyl). In some embodiments, $Rf^1$ is perfluoropropyl (e.g., perfluoro-n-propyl).

In some embodiments, Q is $-SO_2N(R^6)-$ wherein n ranges from 2 to 4, and $R^6$ is hydrogen or alkyl as previously described. In some embodiments, the $R^6$ bonded to the nitrogen atom is methyl or ethyl. In some embodiments, the $R^6$ bonded to the carbon atoms of the polyacrylate backbone is hydrogen or methyl.

In some embodiments, the polyacrylate additive composition comprises a single terminal perfluoroalkyl moiety such as the formula

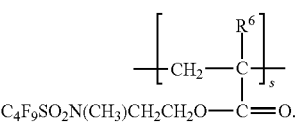

In other embodiments, the polyacrylate additive composition comprises repeat units comprising terminal perfluoroalkyl moieties, such as the fluorochemical oligomeric units described in U.S. Pat. No. 6,174,964; incorporated herein by reference. Such polyacrylate units can be represented by the following formula:

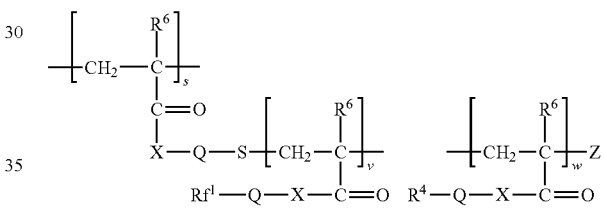

wherein v is 2 to 10 and w is 0 to 5 and $R^4$ is an alkyl group of 1-24 carbon atoms (as subsequently described in further detail). Preferably the ratio of v to w is 2:1 or greater.

In one embodiment, the polyacrylate additive composition comprises units having the formula:

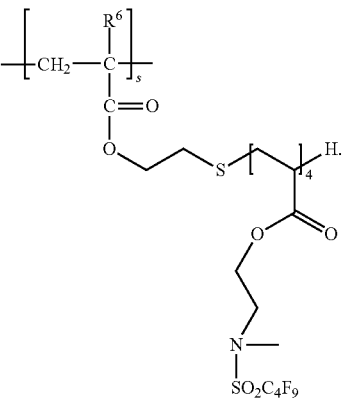

Fluorinated free-radically polymerizable acrylate monomers comprising perfluoroalkyl groups, and methods for their preparation, are known in the art; (see, e.g., U.S. Pat. No. 2,803,615 (Albrecht et al.) and U.S. Pat. No. 6,664,354 (Savu et al.), the disclosures of which, relating to free-radically polymerizable monomers and methods of their preparation, are incorporated herein by reference). Methods described for making nonafluorobutanesulfonamido group-containing structures can be used to make heptafluoropropanesulfonamido groups by starting with heptafluoropropanesulfonyl fluoride, which can be made, for example, by the methods described in Examples 2 and 3 of U.S. Pat. No. 2,732,398 (Brice et al.), the disclosure of which is incorporated herein by reference. Methods for making other perfluoroalkyl compounds are known; (see, e.g., EP1311637 B1, published Apr. 5, 2006, and incorporated herein by reference for the disclosure of the preparation of 2,2,3,3,4,4,4-heptafluorobutyl 2-methylacrylate). Perfluoroalkyl compounds are also available from commercial sources (e.g., 3,3,4,4,5,5,6,6,6-nonafluorohexyl acrylate from Daikin Chemical Sales, Osaka, Japan and 3,3,4,4,5,5,6,6,6-nonafluorohexyl 2-methylacrylate from Indofine Chemical Co., Hillsborough, N.J.).

In some embodiments, the additive comprises a perfluoropolyether group. The perfluoropolyether group $R_f$ can be linear, branched, cyclic, or combinations thereof and can be saturated or unsaturated. The perfluoropolyether has at least two catenated oxygen heteroatoms. Exemplary perfluoropolyethers include, but are not limited to, those that have perfluorinated repeating units selected from the group of —$(C_pF_{2p})$—, —$(C_pF_{2p}O)$—, —$(CF(Z))$—, —$(CF(Z)O)$—, —$(CF(Z)C_pF_{2p}O)$—, —$(C_pF_{2p}CF(Z)O)$—, —$(CF_2CF(Z)O)$—, or combinations thereof. In these repeating units, p is typically an integer of 1 to 10. In some embodiments, p is an integer of 1 to 8, 1 to 6, 1 to 4, or 1 to 3. The group Z is a perfluoroalkyl group, perfluoroether group, perfluoropolyether, or a perfluoroalkoxy group, all of which can be linear, branched, or cyclic. The Z group typically has no more than 12 carbon atoms, no more than 10 carbon atoms, or no more than 9 carbon atoms, no more than 4 carbon atoms, no more than 3 carbon atoms, no more than 2 carbon atoms, or no more than 1 carbon atom. In some embodiments, the Z group can have no more than 4, no more than 3, no more than 2, no more than 1, or no oxygen atoms. In these perfluoropolyether structures, the different repeat units can be distributed randomly along the chain.

$R_f$ can be monovalent or divalent. In some compounds where $R_f$ is monovalent, the terminal groups can be $(C_pF_{2p+1})$—, $(C_pF_{2p+1}O)$—, $(X'C_pF_{2p}O)$—, or $(X'C_pF_{2p+1})$— where X' is hydrogen, chlorine, or bromine and p is an integer of 1 to 10. In some embodiments of monovalent $R_f$ groups, the terminal group is perfluorinated and p is an integer of 1 to 10, 1 to 8, 1 to 6, 1 to 4, or 1 to 3. Exemplary monovalent $R_f$ groups include $CF_3O(C_2F_4O)_nCF_2$—, $C_3F_7O(CF_2CF_2CF_2O)_nCF_2CF_2$—, and $C_3F_7O(CF(CF_3)CF_2O)_nCF(CF_3)$— wherein n has an average value of 0 to 50, 1 to 50, 3 to 30, 3 to 15, or 3 to 10.

Suitable structures for divalent $R_f$ groups include, but are not limited to, —$CF_2O(CF_2O)_q(C_2F_4O)_nCF_2$—, —$(CF_2)_3O(C_4F_8O)_n(CF_2)_3$—, —$CF_2O(C_2F_4O)_nCF_2$—, —$CF_2CF_2O(CF_2CF_2CF_2O)_nCF_2CF_2$—, and —$CF(CF_3)(OCF_2CF(CF_3))_sOC_tF_{2t}O(CF(CF_3)CF_2O)_nCF(CF_3)$—, wherein q has an average value of 0 to 50, 1 to 50, 3 to 30, 3 to 15, or 3 to 10; n has an average value of 0 to 50, 3 to 30, 3 to 15, or 3 to 10; s has an average value of 0 to 50, 1 to 50, 3 to 30, 3 to 15, or 3 to 10; the sum (n+s) has an average value of 0 to 50 or 4 to 40; the sum (q+n) is greater than 0; and t is an integer of 2 to 6.

For embodiments wherein Rf is divalent and two (e.g. terminal) reactive groups are bonded to Rf (such as in the case of a diol), the concentration of such divalent monomer is sufficiently low as to avoid excessive crosslinking that can result in formation of a gel.

In some embodiments, the polyacrylate additive composition comprises a unit represented by the following formula:

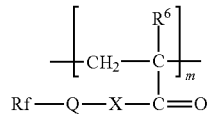

wherein Rf is a (e.g. monovalent) perfluoropolyether group and Q, X and $R^6$ are the same as previously described.

Free-radically polymerizable acrylate monomers comprising perfluoropolyether groups, and methods for their preparation, are known in the art. The perfluoropolyether (meth)acrylate compounds can be synthesized by known techniques such as described in U.S. Pat. Nos. 3,553,179 and 3,544,537 as well as U.S. Patent Application Publication No. US2004/0077775, published Apr. 22, 2004, "Fluorochemical Composition Comprising a Fluorinated Polymer and Treatment of a Fibrous Substrate Therewith". Suitable perfluoropolyether (meth)acrylate compounds include for example HFPO—C(O)NHCH$_2$CH$_2$OC(O)CH=CH$_2$, HFPO—C(O)NHCH$_2$CH$_2$OCH$_2$CH$_2$OCH$_2$CH$_2$OC(O)CH=CH$_2$, HFPO—C(O)NH—(CH$_2$)$_6$OC(O)CH=CH$_2$ and various other perfluoropolyether compounds such as described in U.S. Publication No. US2005/0250921 and U.S. Publication No. US2005/0249940; incorporated by reference. (Meth)acrylate copolymers comprising perfluoropolyether moieties and their preparations are known in the art. See WO2009/076389, Qiu et. al. These preparations may employ chain transfer agents such as thiols, and thermal initiators such as peroxides and azo compounds.

In some embodiments, Rf is HFPO—. Unless otherwise noted, "HFPO—" refers to the end group $F(CF(CF_3)CF_2O)_aCF(CF_3)$— of the methyl ester $F(CF(CF_3)CF_2O)_aCF(CF_3)C(O)OCH_3$, wherein "a" averages 2 to 15. In some embodiments, "a" averages between 3 and 10 or "a" averages between 5 and 8. Such species generally exist as a distribution or mixture of oligomers with a range of values for "a", so that the average value of a may be non-integer. For example, in one embodiment, "a" averages 6.2. The molecular weight of the HFPO— perfluoropolyether material varies depending on the number "a" of repeat units from about 940 g/mole to about 1600 g/mole, with 1100 g/mole to 1400 g/mole typically being preferred.

The polyacrylate additive composition further comprises a unit having hydroxyl groups represented by the following formula:

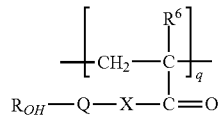

$R_{OH}$ is a hydroxyl containing group;
Q is a connecting group having a valency of at least 2 as previously described;
X is O, S, or $NR^5$, where $R^5$ is H or lower alkyl of 1 to 4 carbon atoms; and
$R^6$ is hydrogen or alkyl as previously described.

The hydroxyl containing group $R_{OH}$ can contain one or more hydroxyl groups. In some embodiments, the unit comprises a single primary hydroxyl group (i.e. —CH$_2$OH).

In other embodiments, the unit comprises a primary hydroxy group and one or more secondary hydroxyl groups (i.e. R'R"CHOH where R', R", are divalent (e.g. alkylene, ether, or ester) groups.

In some embodiments, the units comprising $R_{OH}$ do not comprise an ethylene oxide or propylene oxide repeat unit between the polyacrylate backbone and hydroxyl groups.

In the synthesis of the copolymer additive, a portion of the hydroxyl groups are converted to free-radically polymerizable (e.g. (meth)acrylate) groups such as by the reaction with isocyanatoalkyl acrylate. However, a portion of the hydroxyl groups remain present in the additive.

The portion of the hydroxyl groups that are reacted result in the polyacrylate additive composition further comprising units represented by the following formula:

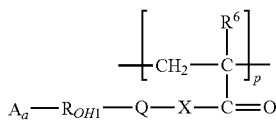

wherein
A is a (meth)acryl functional group such as —OC(O)C(R2)=CH2, where R2 is a lower alkyl of 1 to 4 carbon atoms or H or F;
a ranges from 1 to 6; and
$R_{OH1}$ is the residue of the $R_{OH}$ group (i.e. after functionalization with (meth)acryl functionality); and
Q and X are the same as just previously described with respect to the unit comprising hydroxyl groups.

In some embodiments, a is 1.

The polyacrylate additive composition further comprises a unit represented by the following formula:

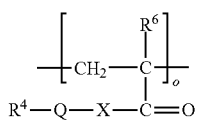

wherein Q and X are the same as just previously described and $R^4$ is an alkyl group of 1-24 carbon atoms. $R^4$ may be a straight-chain, branched, or contain cycloalkyl moieties. In some embodiments, $R^4$ is a lower alkyl group comprising at least 1, 2, 3, or 4 carbon atoms (such as described for $R^6$). In other embodiments $R^4$ is a hydrophobic alkyl group comprising at least 6, 7, or 8 carbon atoms. In yet other embodiments, $R^4$ is a fatty alkyl group having at least 12, or 14, or 15, or 18 carbon atoms.

In some embodiments, the polyacrylate additive comprises other optional units such as a unit represented by the following formula:

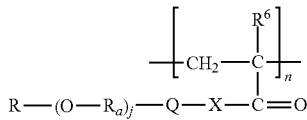

wherein R is a hydrophobic group, such as an alkyl or alkenyl group having greater than 6, 7, or 8 carbon atoms, as previously described;

Ra is independently an alkylene group $C_xH_{2x}$ where x=2 to 4, in which $C_xH_{2x}$ may be straight chain or branched or a combination of the two;
j is the number of alkylene oxide repeat units and ranges from 1 to 50; and
$R^6$ is hydrogen or alkyl as previously described.

In some embodiments, j ranges from 2 to 25. Such group comprising alkylene oxide repeat units may be derived from a non-ionic surfactant. For example, a non-ionic surfactant comprising a (meth)acrylate group can be formed by reacting the hydroxyl group of the previously described fatty alcohols and derivatives thereof with a (meth)acrylic acid or a (meth)acryloyl halide, or functional (meth)acrylate compound such as an isocyanato-functional (meth)acrylate compound. Such (meth)acrylate functional surfactant can then be copolymerized with the other (meth)acrylate compounds.

When the additive comprises greater than 6 repeat units of ethylene oxide, such additive may have improved compatibility with hydroxyl group containing solvents, commonly known as alcohols. Alcohol based coating compositions are especially useful for coating light transmissive substrates such as polycarbonate, acrylic, cellulose acetate, and cellulose triacetate which are susceptible to swelling, cracking, or crazing by organic solvents such as ketones (e.g. MEK), aromatic solvents (e.g. toluene), and esters (e.g. acetate solvents).

The additive may be represented by the general formula:

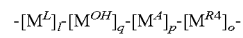

wherein
$[M^L]$ represent units derived from one or more ethylenically unsaturated monomers comprising a low surface energy silicone of fluororinated group;
$[M^{OH}]$ represent units derived from one or more ethylenically unsaturated monomers and at least one hydroxyl group;
$[M^4]$ represent units comprising a residue of $[M^{OH}]$ and a free-radically polymerizable group; and
$[M^{R4}]$ represent units derived from one or more ethylenically unsaturated monomers comprising an alkyl group.

In some embodiments, the additive may be represented by the general formula:

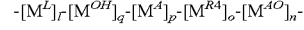

wherein $[M^L]$, $[M^{OH}]$, $[M^4]$, $[M^{R4}]$ are the same as just described and $[M^{AO}]$ represents units derived from one ore more ethylencially unsaturated monomers having alkylene oxide repeat units.

The polyacrylate additive comprises a combination of at least the following four units:

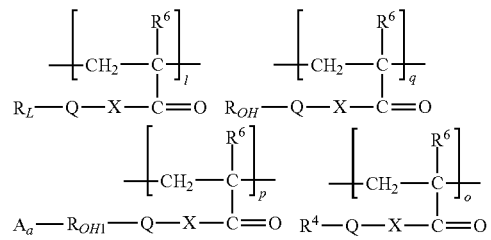

In some embodiments, the polyacrylate additive comprises a combination of the four units just described and the following previously described fifth unit:

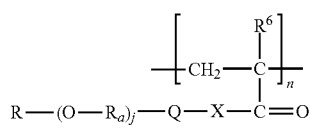

The unit comprising the low surface energy group [M$^L$] or (R$_L$) may be any one or combination of units comprising silicone groups, perfluororalkyl groups, perfluororpolyether groups, or mixture thereof as previously described.

The number of each of the respective units of the polyacrylate additive can vary. For example, l, q, p, o may independently range from 1 to 100; whereas n can range from 0 to 100.

The number of l units (i.e. units comprising the low surface energy group) are chosen such that the copolymer additive comprises about 5-50% by weight l units, more preferably about 10-40% by weight l units. The number of l units is equal to the sum of r (i.e. units comprising silicone group RSi), s (i.e. units comprising perfluoroalkyl containing group Rf$^1$), and m (i.e. units comprising perfluororpolyether group Rf). The polyacrylate additive may further comprise low surface energy groups derived from a chain transfer unit. The number of l units of [M$^L$] is equal to the sum of r, s, m, and t.

The number of q units (i.e. units comprising at least one hydroxyl group) are chosen such that the OH EW of the copolymer additive ranges from about 200 g/equivalent hydroxyl group to 2000 g/equivalent hydroxyl groups, and more preferably 250 g/equivalent OH to 750. On a weight percentage basis this is a range of about 10 to 50% by weight q units. (The copolymer intermediate, prior to converting a portion of the hydroxyl groups to free-radically polymerizable group has a higher hydroxyl content than the copolymer additive.)

The number of p units (i.e. units comprising at least one free-radically polymerizable group) which are derived from the q units, are chosen such that the copolymer additive comprises about 1 to 20% by weight p units, and more preferably 1.5 to 10% by weight p units.

The number of o units (i.e. units comprising an alkyl group) are chosen such that the copolymer additive comprises about 5-80% by weight o units, and more preferably 20-70% by weight o units. The polyacrylate additive may further comprise alkyl groups derived from a chain transfer unit. The number of o units of [M$^{R4}$] is equal to the sum of o and any alkyl units derived from a chain transfer agent.

The number of optional n units (i.e. units comprising alkylene oxide repeat units and a hydrophobic group) are chosen such that the copolymer additive comprises about 0-50% by weight o units, and more preferably 10-50% by weight o units.

The non-ionic surfactant and additive are typically dispersed in a hardcoat composition in combination with a (e.g. alcohol based) solvent, applied to a surface or substrate, such as an optical substrate and photocured. The hardcoat is a tough, abrasion resistant layer that protects the optical substrate and the underlying display screen from damage from causes such as scratches, abrasion and solvents. Typically the hardcoat is formed by coating a curable liquid ceramer composition onto the substrate and curing the composition in situ to form a hardened film.

The coating composition described herein can be employed as a one-layer hardcoat composition. For embodiments wherein high durability is desired, the hardcoat composition typically further comprises (e.g. surface modified) inorganic particles, such as silica. The thickness of the hardcoat surface layer is typically at least 0.5 microns, preferably at least 5 micron, and more preferably at least 10 microns. The thickness of the hardcoat layer is generally no greater than 25 microns. Preferably the thickness ranges from 5 microns to 20 microns.

Alternatively, the coating composition may be free of inorganic oxides particles for uses where durability is not required. In yet other embodiments, an inorganic particle free surface layer may be provided in combination with an inorganic particle containing hardcoat layer disposed between the substrate and the surface layer. This will be referred to as a two-layer hardcoat. In these embodiments, the surface layer preferably has a thickness ranging from about 1 to 10 microns.

The coating compositions described herein are sufficiently durable such that the cured coating exhibits no evidence of scratching or only a few scratches (e.g. 1-3) when tested according to the steel wool abrasion resistance test method described in WO2009/076389 and the forthcoming examples using a weight of 300 g and 10 wipes.

A variety of binder precursors that form a crosslinked polymeric matrix upon curing can be employed in the hardcoat.

Di(meth)acryl binder precursors include for example 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate.

Tri(meth)acryl binder precursor include for example glycerol triacrylate, trimethylolpropane triacrylate, ethoxylated trimethylolpropane triacrylates (e.g. having 3 to 20 ethoxylate repeat), propoxylated glyceral triacrylates, trimethylolpropane triacrylate, tris(2-hydroxyethyl)isocyanurate triacrylate. Higher functionality (meth)acryl containing compounds include for example ditrimethylolpropane tetraacrylate, dipentaerythritol pentaacrylate, ethoxylated pentaerythritol tetraacrylate, caprolactone modified dipentaerythritol hexaacrylate.

One commercially available form of pentaerythritol triacrylate ("PET3A") is SR444C and one commercially available form of pentaerythritol tetraacrylate ("PET4A") is SR295, each available from Sartomer Company of Exton, Pa.

Oligomeric (meth)acryl such as urethane acrylates, polyester acrylates, epoxy acrylates; and polyacrylamide analogues of the foregoing can also be employed as the binder.

In one embodiment, the binder may comprise one or more N,N-disubstituted acrylamide and or N-substituted-N-vinylamide monomers as described in Bilkadi et al. The hardcoat may be derived from a ceramer composition containing about 20 to about 80% ethylenically unsaturated monomers and about 5 to about 40% N,N-disubstituted acrylamide monomer or N-substituted-N-vinyl-amide monomer, based on the total weight of the solids in the ceramer composition.

To facilitate curing, polymerizable compositions described herein may further comprise at least one free-radical thermal initiator and/or photoinitiator. Typically, such an initiator and/or photoinitiator are present in an amount less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. No. 4,654,233 (Grant et al.); U.S. Pat. No. 4,855,184 (Klun et al.); and U.S. Pat. No. 6,224,949 (Wright et al.).

Useful free-radical thermal initiators include, for example, azo, peroxide, persulfate, and redox initiators, and combinations thereof.

Useful free-radical photoinitiators include, for example, those known as useful in the UV cure of acrylate polymers such as described in WO2006/102383.

The polymerizable composition for use as the surface layer or an underlying hardcoat layer preferably contains surface modified inorganic particles that add mechanical strength and durability to the resultant coating.

A variety of inorganic oxide particles can be used in the hardcoat. The inorganic oxide particles can consist essentially of or consist of a single oxide such as silica, or can comprise a combination of oxides, such as silica and aluminum oxide, or a core of an oxide of one type (or a core of a material other than a metal oxide) on which is deposited an oxide of another type. Silica is a common inorganic particle. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid), e.g., as described in U.S. Pat. No. 5,648,407 (Goetz et al.); U.S. Pat. No. 5,677,050 (Bilkadi et al.) and U.S. Pat. No. 6,299,799 (Craig et al.). Aqueous sols (e.g. of amorphous silica) can be employed. Sols generally contain at least 2 wt-%, at least 10 wt-%, at least 15 wt-%, at least 25 wt-%, and often at least 35 wt-% colloidal inorganic oxide particles based on the total weight of the sol. The amount of colloidal inorganic oxide particle is typically no more than 50 wt-% (e.g. 45 wt-%). The surface of the inorganic particles can be "acrylate functionalized" as described in Bilkadi et al. The sols can also be matched to the pH of the binder, and can contain counter ions or water-soluble compounds (e.g., sodium aluminate), all as described in Kang et al. '798.

Various high refractive index inorganic oxide particles can be employed such as for example zirconia ("$ZrO_2$"), titania ("$TiO_2$"), antimony oxides, alumina, tin oxides, alone or in combination. Mixed metal oxides may also be employed. Zirconias for use in the high refractive index layer are available from Nalco Chemical Co. under the trade designation "Nalco OOSSOO8" and from Buhler AG Uzwil, Switzerland under the trade designation "Buhler zirconia Z-WO sol". Zirconia nanoparticle can also be prepared such as described in U.S. Pat. Nos. 7,241,437 and 6,376,590.

The inorganic nanoparticles are preferably treated with a surface treatment agent. Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing. The incorporation of surface modified inorganic particles is amenable to covalent bonding of the particles to the free-radically polymerizable organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependant upon several factors such as particle size, particle type, modifier molecular wt, and modifier type. In general, it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilyl-propyl)methoxyethoxyethoxyethyl carbamate, N-(3-triethoxysilylpropyl)methoxyethoxyethoxyethyl carbamate, 3-(methacryloyloxy)propyltrimethoxysilane, 3-acryloxypropyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy)propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mere aptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof.

The surface modification of the particles in the colloidal dispersion can be accomplished in a variety of known ways, such as described in U.S. Pat. Nos. 7,241,437 and 6,376,590.

A combination of surface modifying agents can be useful, wherein at least one of the agents has a functional group co-polymerizable with a hardenable resin. Combinations of surface modifying agent can result in lower viscosity. For example, the polymerizing group can be ethylenically unsaturated or a cyclic function subject to ring opening polymerization. An ethylenically unsaturated polymerizing group can be, for example, an acrylate or methacrylate, or vinyl group. A cyclic functional group subject to ring opening polymerization generally contains a heteroatom such as oxygen, sulfur or nitrogen, and preferably a 3-membered ring containing oxygen such as an epoxide.

A preferred combination of surface modifying agent includes at least one surface modifying agent having a functional group that is copolymerizable with the organic component of the polymerizable resin and a second amphiphilic modifying agent, such as a polyether silane, that may act as a dispersant. The second modifying agent is preferably a polyalkyleneoxide containing modifying agent that is optionally co-polymerizable with the organic component of the polymerizable composition.

The inorganic particles preferably have a substantially monodisperse size distribution or a polymodal distribution obtained by blending two or more substantially monodisperse distributions. Alternatively, the inorganic particles can be introduced having a range of particle sizes obtained by grinding the particles to a desired size range. The inorganic oxide particles are typically non-aggregated (substantially discrete), as aggregation can result in optical scattering (haze) or precipitation of the inorganic oxide particles or gelation. The inorganic oxide particles are typically colloidal in size, having an average particle diameter of 5 nanometers to 100 nanometers. The particle size of the high index inorganic particles is preferably less than about 50 nm in order to provide sufficiently transparent high-refractive index coatings. The average particle size of the inorganic oxide particles can be measured using transmission electron microscopy to count the number of inorganic oxide particles of a given diameter.

The coating composition described herein can be used to form a (e.g. cured) surface layer, a coated article, or a coated surface such as by applying the coating composition to a surface (e.g. of a substrate or article) and curing polymerizable components of the coating composition. Once polymerizable components present in the coating composition have been cured, a suitable solvent (such as hexane in some embodiments) can be used to extract the lipophilic liquid, such as the unpolymerizable surfactant, from the coated surface or cured coating composition.

The coated surface typically comprises a polymeric organic material comprising a plurality of pores. Although the cured coating composition (i.e. surface layer) may comprise nano-sized pores (e.g. less than 200, or 100, or 50 nanometers), the cured coating is typically free of pores of 1 micron or greater. In some embodiments, the average diameter of the pores is at least 10, 15, or 20 nanometers.

A portion of the pores are interconnected, forming a network (e.g. of tunnels). The lipophilic liquid (e.g. unpolymerizable surfactant) is present in the pores of the polymeric organic material. Without intending to be bound by theory, it is surmised that the wt-% of extractable lipophilic liquid (e.g. unpolymerizable surfactant) relates to the extent of interconnectivity of the pores, as well as the concentration of lipophilic liquid (e.g. unpolymerizable surfactant) present in the coating of the coated surface. It has been found that when a coating composition comprises a low amount of unpolymerizable surfactant (e.g. about 3 wt-%), the amount of lipophilic extractable material relative to the total weight of the coating composition is less than 0.02 wt-%. At this relatively low concentration of free lipophilic liquid (i.e. not covalently bonded to the polymeric organic material), the lipophilic liquid is surmised to be evenly distributed throughout the coated surface. Although a small portion of the lipophilic liquid is exposed at the outermost surface, the majority of the lipophilic liquid is within the cured coating beneath the exposed surface, resulting in only a fraction of the total amount of lipophilic liquid being extractable.

However, when the coating composition comprises greater amounts of lipophilic liquid (e.g. unpolymerizable surfactant) the (i.e. cured) coating composition comprises at least 0.5, 1, 2, 3, 4, or 5 wt-% of solvent extractable lipophilic material. The concentration of material that can be solvent extracted from the coated surface is typically no greater than 15 wt-% and in favored embodiments, no greater than 10 wt-%.

As the concentration of lipophilic liquid (e.g. unpolymerizable surfactant) increases, the number and/or size of the pores increase such that a network of interconnected pores is formed. This may be caused by nanoscopic phase separation of the lipophilic liquid (e.g. unpolymerizable surfactant) from the polymerized resin. If all the lipophilic liquid (e.g. unpolymerizable surfactant) was accessible for extraction, then all the lipophilic liquid would be present in pores exposed to the surface as isolated pores, interconnected pores, or a combination thereof. Thus, 100% of the total pores are present as isolated pores, interconnected pores, or a combination thereof. Typically, less than all the lipophilic liquid (e.g. unpolymerizable surfactant) is solvent extractable from the coated surface. For example, in some embodiments, typically no greater than 90 wt-% or 95 wt-% of the total lipophilic liquid (e.g. unpolymerizable surfactant) is solvent extractable from the cured coating. Thus, 5 or 10% of the lipophilic liquid-containing pores are unexposed to the surface as buried pores. In some embodiments, at least 10, 15, 20, 25, 30, 35, 40, 45, or 50% of the lipophilic liquid-containing pores are exposed to the surface as isolated pores, interconnected pores, or a combination thereof. Further, the lipophilic liquid-containing pores exposed to the surface as isolated pores, interconnected pores, or a combination thereof, may range up to 75, 80, 85, or 90%.

The pore volume of a (e.g. cured) coating or coated (e.g. film) surface can be determined using various techniques in the art. One technique developed by Brunauer, Emmett and Teller, see S. Brunauer, "Physical Adsorption" (Princeton University Press, Princeton, N.J., 1945, is commonly referred to as "BET" gas adsorption. In some embodiments, the coated surface described herein comprises a plurality of pores having a pore volume of at least 0.01 cc/g, or 0.02 cc/g. In some embodiments, the pore volume is no greater than 0.15 cc/g, or no greater than 0.10 cc/g, or no greater than 0.09 cc/g, or no greater than 0.08 cc/g, or no greater than 0.07 cc/g. BET gas adsorption can also be used to determine the surface area of a surface. In some embodiments, the surface area of the coated surface described herein is at least 1 $m^2/g$, or 5 $m^2/g$, or 10 $m^2/g$. The surface area is typically no greater than 50 $m^2/g$, or 45 $m^2/g$, or 40 $m^2/g$, or 35 $m^2/g$, or 30 $m^2/g$.

In some embodiments, a gas adsorption isotherm of the coated surface has a Type H2 hysteresis loop, as described in the IUPAC publication "Reporting Physisorption Data for Gas/Solid Systems with Special Reference to the Determination of Surface Area and Porosity", Pure & Applied Chemistry, Volume 57, No. 4, pp. 603-619, 1985. A Type H2 hysteresis loop is characteristic of a system of disordered pores (i.e. random spatial arrangement of the pores) in a network of interconnected pores with some pore blocking (i.e. necking or small diameter passages between pores that provide some resistance to flow between interconnected pores.

The optical film having a surface layer of the cured coating as described herein may have a gloss or matte surface. Matte films typically have lower transmission and higher haze values than typical gloss films. Whereas gloss surfaces typically have a gloss of at least 130 as measured according to ASTM D 2457-03 at 60°; matte surfaces have a gloss of less than 120. In some embodiments, the haze is less than 5%, or 2.5%, or 1% depending on the intended end use as measured according to ASTM D1003.

A particulate matting agent can be incorporated into the polymerizable composition in order to impart anti-glare properties to the surface layer as described in WO 2008/067262. The particulate matting agent can prevent uneven coloration caused by interference with an associated hard coat layer. One commercially available silica particulate matting agent having an average particle size of 3.5 microns is commercially available from W.R. Grace and Co., Columbia, Md. under the trade designation "Syloid C803".

The coating composition may optionally comprise an antistatic agent as described in WO 2008/067262. Various antistatic particles are commercially available as water-based and solvent-based The non-ionic surfactant, additive, and hardcoat composition can be dispersed in a solvent to form a dilute coating composition. The amount of solids in the coating composition is typically at least 20 wt-% and usually no greater than about 75 wt-%. For some optical substrate such as polycarbonate, acrylic, cellulose acetate, and cellulose triacetate, it is preferred to employ an alcohol based solvent including for example methanol, ethyl alcohol, isopropyl alcohol, propanol, etc. as well as glycol ethers such as propylene glycol monomethyl ether or ethylene glycol monomethyl ether, etc. For such optical substrates, the coating compositions may contain predominantly alcohol solvent(s). For other uses, however, alcohol based solvent(s) may be combined with other (i.e. non-alcohol) solvents.

Thin coating layers can be applied to the optical substrate using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, Modern Coating and Drying Technology, VCH Publishers, NY 1992, ISBN 3-527-28246-7 and Gutoff and Cohen, Coating and Drying Defects: Troubleshooting Operating Problems, Wiley Interscience, NY ISBN 0-471-59810-0.

A die coater generally refers to an apparatus that utilizes a first die block and a second die block to form a manifold cavity and a die slot. The coating fluid, under pressure, flows through the manifold cavity and out the coating slot to form a ribbon of coating material. Coatings can be applied as a single layer or as two or more superimposed layers. Although it is usually convenient for the substrate to be in the form of a continuous web, the substrate may also be a succession of discrete sheets.

Any surface that is routinely touched could benefit from the coating composition described herein. Examples include optical displays (e.g., television screens, computer screens, cell phone screens, console displays in automobiles), optical films (e.g., screen protectors, privacy films), automobile windows, consumer appliances (e.g., stove top, outer surfaces of refrigerator), etc.

The term "optical display", or "display panel", can refer to any conventional optical displays, including but not limited to multi-character multi-line displays such as liquid crystal displays ("LCDs"), plasma displays, front and rear projection displays, cathode ray tubes ("CRTs"), and signage, as well as single-character or binary displays such as light emitting diodes ("LEDs"), signal lamps, and switches. The exposed surface of such display panels may be referred to as a "lens." The invention is particularly useful for displays having a viewing surface that is susceptible to being touched or contacted by ink pens, markers and other marking devices, wiping cloths, paper items and the like.

The coatings of the invention can be employed in a variety of portable and non-portable information display articles. These articles include PDAs, cell phones (including combination PDA/cell phones), LCD televisions (direct lit and edge lit), touch sensitive screens, wrist watches, car navigation systems, global positioning systems, depth finders, calculators, electronic books, CD and DVD players, projection television screens, computer monitors, notebook computer displays, instrument gauges, instrument panel covers, signage such as graphic displays and the like. The viewing surfaces can have any conventional size and shape and can be planar or non-planar, although flat panel displays are preferred. The coating composition or coated film, can be employed on a variety of other articles as well such as for example camera lenses, eyeglass lenses, binocular lenses, mirrors, retroreflective sheeting, automobile windows, building windows, train windows, boat windows, aircraft windows, vehicle headlamps and taillights, display cases, road pavement markers (e.g. raised) and pavement marking tapes, overhead projectors, stereo cabinet doors, stereo covers, watch covers, as well as optical and magneto-optical recording disks, and the like.

A variety of substrates can be utilized in the articles of the invention. Suitable substrate materials include glass as well as thermosetting or thermoplastic polymers such as polycarbonate, poly(meth)acrylate (e.g., polymethyl methacrylate or "PMMA"), polyolefins (e.g., polypropylene or "PP"), polyurethane, polyesters (e.g., polyethylene terephthalate or "PET"), polyamides, polyimides, phenolic resins, cellulose diacetate, cellulose triacetate, polystyrene, styrene-acrylonitrile copolymers, epoxies, and the like.

Such substrates are typically non-absorbent with respect to both aqueous solutions and oils.

Typically the substrate will be chosen based in part on the desired optical and mechanical properties for the intended use. Such mechanical properties typically will include flexibility, dimensional stability and impact resistance. The substrate thickness typically also will depend on the intended use. For most applications, a substrate thickness of less than about 0.5 mm is preferred, and is more preferably about 0.02 to about 0.2 mm. Self-supporting polymeric films are preferred. Films made from polyesters such as PET or polyolefins such as PP (polypropylene), PE (polyethylene) and PVC (polyvinyl chloride) are particularly preferred. The polymeric material can be formed into a film using conventional filmmaking techniques such as by extrusion and optional uniaxial or biaxial orientation of the extruded film. The substrate can be treated to improve adhesion between the substrate and the hardcoat layer, e.g., chemical treatment, corona treatment such as air or nitrogen corona, plasma, flame, or actinic radiation. If desired, an optional tie layer or primer can be applied to the substrate and/or hardcoat layer to increase the interlayer adhesion.

Various light transmissive optical films are known including but not limited to, multilayer optical films, microstructured films such as retroreflective sheeting and brightness enhancing films, (e.g. reflective or absorbing) polarizing films, diffusive films, as well as (e.g. biaxial) retarder films and compensator films such as described in U.S. Patent Application Publication No. 2004/0184150.

As described is U.S. Patent Application Publication 2003/0217806, multilayer optical films provide desirable transmission and/or reflection properties at least partially by an arrangement of microlayers of differing refractive index. The microlayers have different refractive index characteristics so that some light is reflected at interfaces between adjacent microlayers. The microlayers are sufficiently thin so that light reflected at a plurality of the interfaces undergoes constructive or destructive interference in order to give the film body the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 μm. However, thicker layers can also be included, such as skin layers at the outer surfaces of the film, or protective boundary layers disposed within the film that separate packets of microlayers. Multilayer optical film bodies can also comprise one or more thick adhesive layers to bond two or more sheets of multilayer optical film in a laminate.

Further details concerning multilayer optical films and related constructions can be found in U.S. Pat. No. 5,882,774 (Jonza et al.), and PCT Publications WO95/17303 (Ouderkirk et al.) and WO99/39224 (Ouderkirk et al.). Polymeric multilayer optical films and film bodies can comprise additional layers and coatings selected for their optical, mechanical, and/or chemical properties. See U.S. Pat. No. 6,368,699 (Gilbert et al.). The polymeric films and film bodies can also comprise inorganic layers, such as metal or metal oxide coatings or layers.

Various permanent and removable grade adhesive compositions may be coated on the opposite side (i.e. to the hardcoat) of the substrate so the article can be easily mounted to a display surface. Suitable adhesive compositions include (e.g. hydrogenated) block copolymers such as those commercially available from Kraton Polymers of Westhollow, Tex. under the trade designation "Kraton G-1657", as well as other (e.g. similar) thermoplastic rubbers. Other exemplary adhesives include acrylic-based, urethane-based, silicone-based, and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesives are described in U.S. Patent Application Publication No. 2003/0012936. Several of such adhesives are commercially available from 3M Company, St. Paul, Minn. under the trade designations 8141, 8142, and 8161.

GLOSSARY

For the following defined terms, these definitions shall be applied, unless a different definition is given in the claims or elsewhere in the specification.

"Free-radically polymerizable" refers to the ability of monomers, oligomers, polymers or the like to participate in crosslinking reactions upon exposure to a suitable source of free radicals.

"(Meth)acryl" refers to functional groups including acrylates, methacrylates, acrylamides, methacrylamides, alpha-fluoroacrylates, thioacrylates and thio-methacrylates. A preferred (meth)acryl group is acrylate.

"Monovalent perfluoropolyether moiety" refers to a perfluoropolyether chain having one end terminated by a perfluoroalkyl group.

Unless otherwise noted, "HFPO—" refers to the end group $F(CF(CF_3)CF_2O)aCF(CF_3)$— of the methyl ester $F(CF(CF_3)CF_2O)aCF(CF_3)C(O)OCH_3$, wherein "a" averages 2 to 15. In some embodiments, a averages between 3 and 10 or a averages between 5 and 8. Such species generally exist as a distribution or mixture of oligomers with a range of values for a, so that the average value of a may be non-integer. In one embodiment a averages 6.2. This methyl ester has an average molecular weight of 1,211 g/mol, and can be prepared according to the method reported in U.S. Pat. No. 3,250,808 (Moore et al.), with purification by fractional distillation.

The recitation of numerical ranges by endpoints includes all numbers subsumed within the range (e.g. the range 1 to 10 includes 1, 1.5, 3.33, and 10).

Objects and advantages of this invention are further illustrated by the following examples, but the particular materials and amounts thereof recited in these examples, as well as other conditions and details, should not be construed to unduly limit this invention.

EXAMPLES

All parts, percentages, ratios, etc. in the examples are by weight, unless noted otherwise. Solvents and other reagents used were obtained from Sigma-Aldrich Chemical Company; Milwaukee, Wis. unless specified differently.

Test Methods

Fingerprint Visibility Test

To test the samples, a background haze was measured using a Haze-Gard Plus from BYK-Gardner (Columbia, Md.) then a simulated fingerprint was applied to the coating and then the haze was again measured using the Haze-Gard Plus. The simulated fingerprint was applied as follows. A solution was prepared by mixing 0.35 parts Crisco Shortening (J. M. Smucker Company, Orrville, Ohio) with 0.35 parts $C_{57}H_{104}O_6$ (obtained from Sigma Chemical Co., St. Louis, Mo. under the trade designation "Triolein" and 8.0 parts isopropyl alcohol. The solution was coated on 127 micron (5 mil) primed PET film using a #10 wire wound rod which was rapidly pulled across the film. The sample was allowed to dry for 30 min. A #5 stopper (from VWR Scientific) having a bottom outer diameter of about 2.3 cm was attached to a plunger (2.5 pound plunger from Summer Optical, Fort Washington, Pa.). The plunger with stopper was pressed onto the coated PET (inking the stopper). Next the plunger was pressed onto the sample to be tested. The haze of the applied simulated fingerprint was measured immediately and again after 20 minutes. The fingerprint ratio (FPR) is the ratio of the haze measured after 20 minutes to the initial haze. The background haze, the initial haze after applying the simulated fingerprint, and the fingerprint ratio may be provided in the Examples.

Cellulose Haze Test

After the cured coating was prepared it was allowed to equilibrate at ambient conditions for 48 hours. Then 0.35 grams of alpha-cellulose (C-8002) from Sigma Chemical Company (St. Louis, Mo.) was applied to the top of the coating in a 7 cm dia. area. The coated film was tilted back and forth several times to allow the cellulose to evenly coat the 7 cm. dia. test area. The excess cellulose was then shaken off and the haze of the coating plus cellulose was measured using a hazemeter according to ASTM D1003-11e1, Procedure A.

Steel Wool Durability Test and Results

The abrasion resistance of the cured films was tested cross-web to the coating direction by use of a mechanical device capable of oscillating a steel wool sheet adhered to stylus across the film's surface. The stylus oscillated over a 60 mm wide sweep width at a rate of 210 mm/sec (3.5 wipes/sec) wherein a "wipe" is defined as a single travel of 60 mm. The stylus had a flat, cylindrical base geometry with a diameter of 3.2 cm. The stylus was designed for attachment of weights to increase the force exerted by the steel wool normal to the film's surface. The #0000 steel wool sheets were "Magic Sand-Sanding Sheets" available from Hut Products Fulton, Mo. The #0000 has a specified grit equivalency of 600-1200 grit sandpaper. The 3.2 cm steel wool discs were die cut from the sanding sheets and adhered to the 3.2 cm stylus base with 3M Brand Scotch Permanent Adhesive Transfer tape. A single sample was tested for each example, with a 500 g weight and 50 back and forth wipes. The sample was then visually inspected for scratches and rated on a 1-5 scale with 5 indicating the best durability.

Materials

Nalco 2327—an aqueous dispersion of 20 nm silica nanoparticles (41% solids in water, stabilized with ammonia) obtained from Nalco Chem. Co. Naperville, Ill.

PROSTAB 5198—4-hydroxy-2,2,6,6-tetramethyl-1-piperidinyloxy (commonly referred to as 4-hydroxy-TEMPO) obtained from CIBA Specialty Chemicals, Tarrytown, N.Y.

Sartomer SR444—pentaerythritol triacrylate (PET3/4) obtained from Sartomer Company, Exton, Pa.

PET film: 127 micron (5 mil) primed PET film prepared according to Example 29 of U.S. Pat. No. 6,893,731.

BHT—2,6-di-t-butyl-4-methylphenol obtained from Sigma Aldrich, Milwaukee, Wis.

Dodecanol, Dibutyltin dilaurate (DBTDL), Glycidol, Phenothiazine, and hydroxyethyl acrylate, Octadecyl acrylate and Octadecyl methacrylate were obtained from Sigma Aldrich, Milwaukee, Wis.

Catalyst AMC-2 was obtained from Ampac Fine Chemocals, Rancho Cordova, Calif.

2-carboxyethyl acrylic acid (B-CEA) was obtained from Polysciences, Inc., Warrington, Pa.

Brij O2—primary component $C_{18}H_{35}(OCH_2CH_2)_2OH$ (oleyl alcohol with 2 ethyleneoxy groups), (calculated HLB 5.4), Brij O5—primary component $C_{18}H_{35}(OCH_2CH_2)_5OH$ (oleyl alcohol with 5 ethyleneoxy groups) (calculated HLB 9.3), Brij O10—primary component $C_{18}H_{35}(OCH_2CH_2)_{10}OH$ (oleyl alcohol with 10 ethyleneoxy groups) (calculated HLB 12.9), and Brij S20—primary component $C_{18}H_{37}(OCH_2CH_2)_{20}OH$ (oleyl alcohol with 20 ethyleneoxy groups) (calculated HLB 15.9) were obtained from Croda Inc., Edison, N.J.

VAZO 67, 2,2-azobis(2-methylbutyronitrile) was obtained from DuPont, Wilmington, Del.

Ethyl acetate was obtained from J. T. Baker, Austin, Tex.

Esacure One—2-hydroxy-1-{1-[4-(2-hydroxy-2-methylpropionyl)-phenyl]-1,3,3-trimethyl-indan-5-yl}-2-methylpropan-1-one from Lamberti SPA, Gallarate, Italy.

PROSTAB 5198—4-hydroxy-2,2,6,6-tetramethyl-1-piperidinyloxy (commonly referred to as 4-hydroxy-TEMPO) was obtained from CIBA Specialty Chemicals, Tarrytown, N.Y.

Isocyanatoethyl acrylate (IEA) and isocyanatoethyl methacrylate (IEM) were obtained from CBC America Corp, Commack, N.Y.

Isofol 18T alcohol, a mixture of 2-hexyldecanol, 2-octyldecanol, 2-hexyldodecanol, and 2-octyldodecanol (Guerbet alcohol) was obtained from SASOL, Lake Charles, La.

Beta-carboxyethylacrylate (B-CEA) having a titration measured acid equivalent weight of 204.5 was obtained from Polysciences, Inc., Warrington, Pa.

Components Comprising Low Surface Energy Silicone Group

MCR-C12—Monocarbinol terminated poly(dimethylsiloxane) of 1000MW from Gelest, Morrisville, Pa.

MCR-C18—Monocarbinol terminated poly(dimethylsiloxane) of 5000MW from Gelest, Morrisville, Pa.

Preparation of MCR-C12-IEA

Into a 250 ml round-bottom flask was poured 29.99 g (~0.02999 mols) of MCR-C12. 393 microliters (1000 ppm) of 10% DBTDL in MEK was added as a catalyst, followed by 3.81 g (0.0269 mols) of isocyanatoethyl acrylate. This ratio of reactants was determined in a small-scale trial in which the amount of isocyanate was slowly increased from 0.9 mol fraction until a very small isocyanate peak remained via FTIR. Upon addition of both reactants the solution became cloudy. The reaction was stirred magnetically under dry air at 55° C. for 3 hours, at which time an analysis via FTIR showed no isocyanate was present. The solution was brought to 50% solids in ethyl acetate and bottled.

Preparation of MCR-C18-IEA

Into a 250 ml round-bottom flask was poured 30.00 g (0.006 mols) of MCR-C18. 364 microliters (1000 ppm) of 10% DBTDL in MEK was added as a catalyst, followed by 0.98 g (0.0069 mols) of isocyanatoethyl acrylate. This ratio of reactants was determined in a small-scale trial in which the amount of isocyanate was slowly increased from 0.9 mol fraction until a very small isocyanate peak remained via FTIR. Upon addition of both reactants the solution was clear and colorless. The reaction was stirred magnetically under dry air at 55° C. for 1.5 hours, at which time an analysis via FTIR showed no isocyanate was present. Upon completion of the reaction the solution had turned white and opaque. The solution was brought to 50% solids in ethyl acetate and bottled.

C-3b Methacryloyl terminated poly(dimethylsiloxane) of approximately 10,000 MW was prepared by the method outlined for preparation of Monomer "C-3b" in U.S. Pat. No. 4,728,571.

KF-2001—Thiol terminated poly(dimethylsiloxane) of 1900MW from Shin-Etsu Silicones of America, Akron, Ohio.

Components Comprising Low Surface Energy Perfluoroalkyl Group

MeFBSEA (m)—$C_4F_9SO_2N(CH_3)CH_2CH_2OC(O)CH=CH_2$, can be prepared by the general procedure found in U.S. Pat. No. 2,803,613.

Preparation (MeFBSEA)$_4$SCH$_2$CH$_2$OH Oligomer ((FC)4-oligomer)

4 mol parts of MeFBSEA and 1 mol part of thioethanol at 75% solids in ethyl acetate were purged with nitrogen for about 5 min, followed by a charge of about 0.5% by weight of VAZO 67, followed by heating at 65° C., for about 15 h.

Preparation of (FC)4-oligomer-IEA

A 250 ml round-bottom flask was charged with 100.02 g (0.0436 mols) of (FC)4-oligomer (estimated molecular weight of 1723 at 100% solids) at 75% solids in ethyl acetate, 1.22 ml (1000 ppm) of 10% DBTDL in MEK, followed by 5.54 g (0.03926 mols) of isocyanatoethyl acrylate. The reaction was stirred magnetically under dry air at 55° C. for two hours. At this point the isocyanate was observed by FTIR to have been consumed, so an additional 0.30 g (5%) of IEA was added. After two hours at the same reaction conditions the isocyanate was again consumed and two additional charges were made—0.15 g (2.5%) and 0.30 g (5%)—separated by two hours. About 1.5 hours after the last addition the isocyanate peak was still barely visible but diminished from the FTIR taken immediately after the last IEA addition and the reaction was pronounced complete. The product was brought to 50% solids with ethyl acetate and bottled.

Component Comprising Low Surface Energy Perfluoroether Group

Preparation of HFPO Amidol Acrylate

HFPO—C(O)N(H)CH$_2$CH$_2$OH(HFPO amidol) with molecular weight 1420 was made by a procedure similar to that described in U.S. Pat. No. 7,098,429 (Audenaert, et al.), the disclosure of which is incorporated herein by reference, for the synthesis of HFPO-oligomer alcohols with the exception that the HFPO methyl ester F(CF(CF$_3$)CF$_2$O)$_a$CF(CF$_3$)C(O)OCH$_3$ with a=6.2 was replaced with F(CF(CF$_3$)CF$_2$O)$_a$CF(CF$_3$)C(O)OCH$_3$ where a=7.3. The HFPO methyl ester was prepared according to the method reported in U.S. Pat. No. 3,250,808 (Moore, et al.), the disclosure of which is incorporated herein by reference, with purification by fractional distillation.

HFPO Acrylate (also referred to as HFPO-A was made from the HFPO amidol using the procedure described in Preparative Example 2 of U.S. Pat. No. 6,995,222 (Buckanin, et al.).

Components Comprising Hydroxyl Group(s)

Hydroxybutyl acrylate was obtained from TCI America, Portland, Oreg.

Hydroxyethyl acrylate was obtained from Sigma-Aldrich, Milwaukee, Wis.

Preparation of B-CEA-1.42 Glycidol (also referred to as B-CEA-1.42 GLY)

Into a 1-liter, three-neck round bottom flask was poured 198.14 g (0.967 mol, 204.8 acid equivalent weight) beta-carboxyethylacrylate. Next, 1.49 g (0.5% by weight) of AMC-2 catalyst was added, and the reaction was set stirring at 95° C. via mechanical, overhead stirring in a silicone oil bath. The reaction was kept under dry air throughout. Into a pressure equalized dropping funnel, 101.83 g (1.374 mols, 74.08 MW, 1.42 equivalents compared to the B-CEA) of glycidol was charged. The glycidol was added via the dropping funnel at a steady rate over 55 minutes. The reaction was stirred at 95° C. for three hours after the end of the glycidol addition, at which point a sample was taken for analysis. Analysis via $^1$H NMR in CDCl$_3$ showed negligible amounts of remaining reactants and 286.31 g of solution were bottled. Beta-carboxyethylacrylate is available as a distribution of products that includes acrylic acid, beta-carboxyethylacrylate, and higher oligomers. The beta-carboxyethylacrylate from Polysciences used here has a titration measured acid equivalent weight of 204.5. Its reaction with glycidol is expected to largely provide the distribution of materials pictured below.

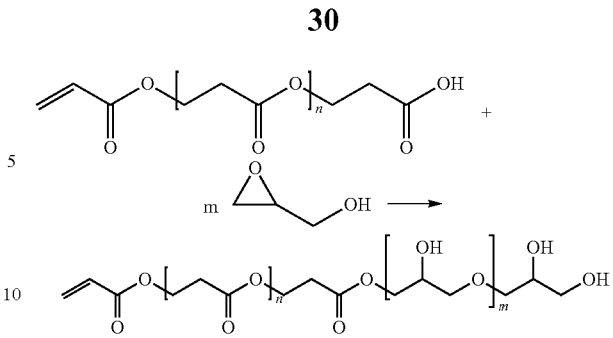

Components Comprising Alkyl Group

Lauryl acrylate was obtained as SR335 from Sartomer, Exton, Pa.

Preparation of Hexanol-IEA

Into a 1-liter round bottom flask was added 2.1 ml of 10% DBTDL in MEK solution. To that, 0.1779 g (0.5% by weight of reactants) of BHT was added. 149.99 g (1.468 mols) of hexanol (calculated HLB=4.9) was added, followed by 357.19 g ethyl acetate. Finally 207.16 g (1.468 mols) of isocyanatoethyl acrylate was added, bringing the solution to 50% solids. The reaction was stirred magnetically at 65° C. in a silicone oil bath and kept under dry air. The reaction was clear and colorless throughout. After 15 minutes, the reaction temperature was turned down to 50° C. to prevent boiling of ethyl acetate (some solvent lost). After 45 minutes, a sample was taken and analyzed via FTIR. No isocyanate peak was present so the reaction was stopped. 157.53 g of ethyl acetate were added to bring the solution to 50% solids and 702.38 g of solution was bottled. The structure below illustrates the type of product obtained from reactions of alcohols with IEA.

$$\text{acrylate-O-CH}_2\text{CH}_2\text{-NH-C(O)-O-(CH}_2)_5\text{-CH}_3$$

Preparation of Dodecanol-IEA

Into a 1-liter round bottom flask was added 2.05 mL of 10% DBTDL in MEK solution. To that, 0.1777 g (0.5% by weight of reactants) of BHT was added. 199.99 g (1.0733 mols) of dodecanol (calculated HLB=2.1) was added, followed by 351.40 g ethyl acetate. Finally 151.48 g (1.0733 mols) of isocyanatoethyl acrylate was added, bringing the solution to 50% solids. The reaction was stirred magnetically at 60° C. in a silicone oil bath and kept under dry air. The reaction was clear and colorless throughout. After 15 minutes, the reaction temperature was turned down to 50° C. to prevent boiling of ethyl acetate. After 1 hour, a sample was taken and analyzed via FTIR. The FTIR analysis showed no isocyanate peak was present and the reaction was stopped. 700.03 g was bottled.

Preparation of Guerbet C18-IEA

The acrylate of Isofol 18T was prepared as described in U.S. Pat. No. 8,137,807 (Clapper, et al.) for Method 1, Monomer GM4.

Into a 1-liter round bottom flask was added 1.80 mL of 10% DBTDL in MEK solution. To that, 0.1490 g (0.5% by weight of reactants) of BHT was added. 199.98 g (0.7586 mols) of Isofol 18T was added, followed by 307.06 g ethyl acetate. Finally 107.05 g (0.7586 mols) of isocyanatoethyl acrylate was added, bringing the solution to 50% solids. The reaction was stirred magnetically at 50° C. in a silicone oil bath and kept under dry air. The reaction was clear and colorless throughout. After 1.25 hours, a sample was taken and analyzed via FTIR. The FTIR analysis showed no isocyanate peak was present and the reaction was stopped. 605.56 g was bottled.

Components Comprising Hydrophobic Group and Alkylene Oxide Units

Synthesis of Polymerizable Surfactant Brij O2 Acrylate

To a 1l round bottom flask equipped with magnetic stirbar and heat-tape wrapped Dean-Stark trap with condenser was added 200 g (0.561 mol) Brij O2, 41.22 g (0.572 mol) acrylic acid, 0.05 g BHT (~500 ppm based on solids), 0.05 g phenothiazine, and 300 g heptane. The reaction was heated in an oil bath. When the internal temperature was about 80° C., 2.96 g (0.0308 mol) methanesulfonic acid was added to the reaction. The oil bath was raised to 120° C., and the heating tape was turned on. After 4 h of refluxing, 10.0 ml of water was collected, the reaction was cooled to 80° C., and 4.69 g (0.0314 mol) triethanolamine was added with stirring to the reaction. After 5 min, 120 g of deionized water was added to the reaction, which was stirred for 1 min, transferred to a separatory funnel, shaken and allowed to settle overnight. Three layers resulted: a clear aqueous layer (84.2 g), and an interphase with a brown gooey mixture (48.7 g), and a top light brown layer. The top layer was isolated and heated in a flask with 120 g of 2% aqueous sodium carbonate to 80° C. T mixture was allowed to settle in the separatory funnel with heating to 75° C. The layers were separated, and the aqueous layer was re-extracted with 50 g of heptane. The combined heptane layers were dried over anhydrous magnesium sulfate, filtered and concentrated on a rotary evaporator to yield 209.7 g (91.1% yield) of a light brown oil, which was characterized by $^1$H NMR. The calculated hydrophilic-lipophilic balance (HLB) of this surfactant is 5.6, assuming two ethylene oxide repeat units.

Preparation of Brij O5-IEA

Into a 500 mL round bottom flask was poured 50.00 g (0.1021 mols) $C_{18}H_{35}O(CH_2CH_2O)_5H$ and 64.41 g MEK. A line was placed on the flask to indicate the level of the solution, and about 40 g more MEK was added. Removal of excess MEK was done azeotropically by boiling off MEK at 95° C. until the level of the solution was just below the original line drawn on the flask. 250 µL 10% DBTDL in MEK solution was added followed by 12 mg BHT and 14.41 g (0.100 mol) isocyanatoethyl acrylate in 2 g of MEK. The reaction was stirred magnetically in a 60° C. silicone oil bath for about 3 hours at which point a sample was taken for analysis. FTIR analysis showed no isocyanate peak and the reaction was stopped. The solution was adjusted to 50% solids with the addition of 18.68 g MEK and bottled.

Preparation of Brij O5 Acrylate

A 1.0-liter round bottom flask was charged with 250 g (0.5117 mols) Brij O5, 250 g heptane, 37.66 g (0.5220 mols) acrylic acid, 0.0575 g MEHQ and 0.0575 g Prostab 5198 inhibitor. The reaction was heated to 120° C. in a silicone oil bath. The flask was topped by a Dean-Stark (D-S) trap wrapped in heat tape with a condenser atop the D-S trap. When the reaction was warm, 3.42 g (0.03558 mols) of methanesulfonic acid was charged and reaction was run for 4.5 hours. 9.4 mL had collected in the D-S trap. The reaction temperature was dropped to 90° C. and 5.55 g (0.0372 mols) of triethanolamine was added. The reaction was then stirred for 5 minutes at which point the reaction was heated to 70° C. and 100 g of distilled water was added. The reaction was poured into a separatory funnel, resulting in a yellow top layer and whitish bottom layer. The layers were allowed to separate over 1 hour. 25 g of saturated brine was added to help clean out the bottom layer and the separatory funnel was tilted a few times and left to separate overnight. The organic layer weighed 498.8 g. The top layer was heated in a 90° C. silicone oil bath while stirred. When heated to 70° C., 100 g of 2% $Na_2CO_3$ solution was added along with 6 g of a 1:5 mixture of 2% $Na_2CO_3$: organic layer used to determine a best-method for the split. The solution was stirred for 3.5 minutes to an internal temperature of 65° C. and then poured into a 1-liter separatory funnel By a combination of heating and stirring, a clean lower layer, whitish middle, and yellow top layer appeared. The next day a good separation had occurred and 20 g silica gel was added to the organic layer and stirred at 50° C. in a silicone oil bath. Six type C flitted Buchner funnels were used to filter the material (funnels were used until too plugged to filter). The funnels were rinsed with heptane and the material was concentrated on a rotary evaporator at 93° C. and 28 in Hg. The yield was 212.24 g. The calculated hydrophilic-lipophilic balance (HLB) of this surfactant is 9.2.

Preparation of Brij O10-IEA

Into a 250 mL round bottom flask was poured 50.00 g (0.1021 mols) $C_{18}H_{35}O(CH_2CH_2O)_{10}H$ and 59.94 g MEK. A line was placed on the flask to indicate the level of the solution, and about 40 g more MEK was added. Removal of excess MEK was done azeotropically by boiling off MEK at 95° C. until the level of the solution was just below the original line drawn on the flask. 220 µL 10% DBTDL in MEK solution was added, followed by 10 mg BHT and 14.41 g (0.100 mol) isocyanatoethyl acrylate. The addition flask was rinsed with 2 g MEK and the reaction was stirred magnetically in a 55° C. silicone oil bath for about 3 hours at which point a sample was taken for analysis. FTIR analysis showed no isocyanate peak and the reaction was stopped. The solution was adjusted to 50% solids with the addition of 22.11 g MEK and bottled.

Preparation of Brij O10 Acrylate

A 1.0-liter round bottom flask was charged with 250 g (0.352 mols) Brij O10, 250 g heptane, 15.88 g acrylic acid (0.359 mols), 0.0552 g MEHQ and 0.0552 g Prostab 5198 inhibitor. The reaction was heated to 120° C. in a silicone oil bath. The flask was topped by a Dean-Stark trap wrapped in heat tape with a condenser atop the D-S trap. When the reaction was warm, 3.58 g (0.03725 mols) of methanesulfonic acid was charged and reaction was run for 8 hours. The next day, 8.2 mL had collected in the D-S trap. The reaction was heated to 52° C. and 5.72 g (0.0383 mols) of triethanolamine was added. The reaction was then stirred for 5 minutes at which point the reaction was heated to 80° C. and 50 g of water was added. A separation over several hours resulted in a small bottom layer (~18 g). The top layer was treated with 50 g of silica gel and then filtered through a type C flitted Buchner funnel 10 different filters were needed to complete the filtration due to clogging. The next day the material was condensed on a rotary evaporator at up to 90° C. and 85 kPa (25 in. Hg) vacuum to provide a light brownish oil with a small amount of particles. The calculated hydrophilic-lipophilic balance (HLB) of this surfactant is 12.5.

Preparation of Brij S20-IEA

In a 500 ml round bottom flask, 100.00 g (0.0944 mols) dried, molten Brij S20 was added to 113.33 g ethyl acetate. The solution was put into a 60° C. silicone oil bath and stirred magnetically under dry air. To the stirring solution was added 0.0567 g BHT and 0.0567 g 10% DBTDL in MEK. 13.33 g (0.0944 mols) of isocyanatoethylacrylate was added to a dropping funnel and added to the reaction over 10 minutes. The dropping funnel was rinsed with 1.5 g ethyl acetate. After reaction overnight, analysis was done via FTIR which showed no isocyanate peak. The reaction was brought to 50% solids and bottled.

Synthesis of Non-Ionic Surfactant

To a 250 ml round bottom flask equipped with an overhead mechanical stirrer, temperature probe and Dean-Stark trap with condenser was added 50 grams (0.177 moles) 90% oleic acid (technical grade), 0.168 moles (0.95 equivalents) of diethyleneglycol monoethyl ether, 100 grams cyclohexane, and 1.5 grams para-toluene sulfonic acid. The batch was heated to reflux with moderate agitation to azeotrope off water from the esterification and water was collected in a dean-stark trap. After four hours of reflux, a total of 3 grams of water had been collected and no further water was being produced. Liquid chromatography showed a small amount of residual oleic acid.

The reaction was allowed to cool to room temperature. To the flask a mixture of 60 grams water and 6 grams sodium carbonate was added and 4.5 grams isopropyl alcohol was added. The contents of the flask were mixed well and then allowed to phase separate in a separatory funnel. The lower aqueous layer was removed. Then a mixture of 70 grams saturated sodium chloride in water was added, the flask shaken, and the contents allowed to separate. The lower aqueous layer was removed. The residual cyclohexane solvent was removed from the ester product using a rotary-evaporator to provide 58 g of a light yellow colored product. Liquid chromatography showed no residual oleic acid. The calculated hydrophilic-lipophilic balance (HLB) of this surfactant is 4.7.

Polymerizable Surfactant BrijO2 Acrylate—Synthesis previously described.

Preparation of Surface Modified Nanosilica Dispersion 305 grams of Nalco 2327 was added to a 1-liter reaction flask. 486 grams of 1-methoxy-2-propanol was added to the reactor with stirring. 19.38 grams of 3-methacryloxypropyltrimethoxysilane was added slowly to the reactor with stirring. 0.15 grams of a 5% aqueous of PROSTAB 5198 was added to the reactor with stirring. The mixture was stirred 18 hours at 90° C.

The reaction mixture was heated under vacuum and the 1-methoxy-2-propanol/water azeotrope was distilled off with any necessary addition of 1-methoxy-2-propanol to remove substantially all of the water. The surface modification reaction resulted in a mixture containing 40% surface modified silica (20 nm average particle size), by weight, in 1-methoxy-2-propanol.

Preparation of SiO2/SR444

Surface modified nanosilica in Sartomer SR444 was prepared by mixing Sartomer SR444 and the 1-methoxy-2-propanol dispersion of surface modified nanosilica described in "Surface Modified Nanosilica Dispersion" with weight ratios of 30 modified silica to 70 SR 444. The 1-methoxy-2-propanol was then evaporated using a rotary-evaporator.

Examples 1-15

The HFPO copolymer for Example 1 was synthesized as follows. In a clean glass reaction bottle were added 0.125 grams of dodecanethiol, 20.0 grams of a 50% solids solution of HFPO amidol-acrylate in EtOAc (Ethyl acetate), 10 grams of a 50% solids solution of B-CEA-1.42 Glycidol in EtOAc, 20 grams of a 50% solution of dodecanol-IEA in Ethyl Acetate, 0.125 grams of VAZO 67 and 25 grams of EtOAc. The solution was purged with nitrogen for two minutes. The bottle was sealed and placed in a constant temperature water bath with a rotating device. The solution was heated at 65° C. for 16 hours and then cooled to room temperature. A medium viscous polymer solution was obtained.

Half of this 75.25 grams of solution (37.625 grams, containing 12.625 grams solids) This solution was charged into a 50 mL amber jar equipped with a magnetic stirbar along with 75 microliters of 10% DBTDL in MEK, and 0.25 grams of IEA and placed in an oil bath at 55° C. for 1 hr 15 min. At that time, the reaction was monitored for completeness by disappearance of an isocyanate peak in the FTIR spectrum of the sample. The reaction was adjusted to 30% solids with 5.29 grams ethyl acetate.

Using the procedure described for Example 1, HFPO copolymers for Examples 2-15 were made by preparing a solution of the materials in the table below except for IEA with the addition of 25 parts EtOAc, 0.125 parts VAZO 67, 0.125 parts Dodecane-thiol. The resulting solution was reacted with DBTDL and IEA as described in Example 1 with the weight parts IEA indicated in the table below. After the reaction was complete it was adjusted to 30% solids with 10.58 weight parts ethyl acetate. All parts are by weight of solution and all materials at 50% solids except VAZO 67, dodecane-thiol and IEA.

| Example | HFPO Acrylate | B-CEA-1.42 Glycidol | Additional Acrylate | Additional Acrylate | Dodecanol-IEA | IEA |
|---|---|---|---|---|---|---|
| 1 | 20 | 10 | — | — | 20 | 0.5 |
| 2 | 20 | 10 | Brij O10-IEA | 5 | 15 | 0.5 |
| 3 | 20 | 10 | Brij O2 acrylate | 5 | 15 | 0.5 |
| 4 | 15 | 10 | Brij S20-IEA | 10 | 15 | 0.5 |
| 5 | 15 | 10 | Brij O5-IEA | 10 | 15 | 0.5 |
| 6 | 15 | 10 | Brij O10-IEA | 10 | 15 | 0.5 |
| 7 | 15 | 10 | Brij O2 acrylate | 10 | 15 | 0.5 |
| 8 | 20 | 0 | Hydroxyethyl acrylate | 10 | 20 | 0.5 |
| 9 | 20 | 0 | Hydroxybutyl acrylate | 10 | 20 | 0.5 |

| Example | HFPO Acrylate | B-CEA-1.42 Glycidol | Additional Acrylate | Additional Acrylate | Dodecanol-IEA | IEA |
|---|---|---|---|---|---|---|
| 10 | 20 | 0 | Hydroxyethyl acrylate | 15 | 15 | 0.5 |
| 11 | 20 | 0 | Hydroxybutyl acrylate | 15 | 15 | 0.5 |
| 12 | 20 | 10 | Brij S20-IEA | 5 | 15 | 0.5 |
| 13 | 20 | 10 | Brij O5 acrylate | 5 | 15 | 0.5 |
| 14 | 20 | 10 | Brij O5-IEA 308 | 5 | 15 | 0.5 |
| 15 | 20 | 10 | Brij O10 acrylate | 5 | 15 | 0.5 |

For each of Examples 1-15, the HFPO copolymer additives were formulated into an anti-fingerprinting coating formulation according to the following table:

| Material | Amount Solids (parts by weight) |
|---|---|
| SiO$_2$/SR 444 | 77.43 |
| Esacure One | 2.15 |
| Non-Ionic Surfactant | 12.4 |
| Polymerizable Surfactant Brij O2 Acrylate | 7.9 |
| HFPO Copolymer Additive | 0.036 |

Coating solutions were made by dissolving the materials listed in the above table in ethanol at 65% solids. These solutions were coated on a primed 127 micron (5 mil) PET film. The coatings were coated at a dry thickness of about 15 microns using a #18 wire wound rod. The coatings were dried in an air circulating oven at 105° C. for two minutes.

The coatings were then were UV cured using a nitrogen purged Fusion Light Hammer® 6 with a 500 watt Fusion H bulb (Fusion UV Systems, Inc., Gaithersburg, Md.) and placed on the conveyer at 12.2 m/min (40 ft/min)

The Fingerprint Test and the Cellulose Haze Test were performed on the samples. The cellulose haze and the ratio of the fingerprint after 20 minutes to the initial fingerprint (FPR) are reported in the table below.

| Example | Cellulose Haze | FPR |
|---|---|---|
| 1 | 1 | 0.40 |
| 2 | 14 | 0.38 |
| 3 | 13 | 0.29 |
| 4 | 5 | 0.31 |
| 5 | 9 | 0.37 |
| 6 | 10 | 0.40 |
| 7 | 1 | 0.41 |
| 8 | 4 | 0.44 |
| 9 | 4 | 0.43 |
| 10 | 4 | 0.37 |
| 11 | 1 | 0.42 |
| 12 | 6 | 0.46 |
| 13 | 10 | 0.58 |
| 14 | 7 | 0.68 |
| 15 | 13 | 0.76 |

Examples 16-20 and Comparative Examples C1-C2

The formulation for the copolymer batch used for Examples 16-22 were prepared according to the table below using a procedure similar to that for the preparation of the HFPO copolymer of Example 1. All materials were at 50% solids in ethyl acetate except for the VAZO 67 and dodecane-thiol.

| Material | Amount (grams) |
|---|---|
| HFPO Acrylate Solution | 65.86 |
| Hydroxybutyl Acrylate Solution | 74.14 |
| Lauryl Acrylate (SR 335) Solution | 60 |
| EtOAc | 100 |
| VAZO 67 | 0.5 |
| Dodecane-thiol | 0.5 |

The HFPO copolymers for Examples 16-22 were prepared by reacting the amount of IEM shown in the table below with one-eighth of the batch described above. After the reaction was complete, EtOAc was added in the amount shown in the table below to bring the solution to 30% solids.

| Example | C1 | 16 | 17 | 18 | 19 | 20 | C2 |
|---|---|---|---|---|---|---|---|
| IEM (g) | 0 | 0.25 | 0.5 | 1.25 | 2.49 | 3.74 | 4.99 |
| EtOAc (added to bring to 30% solids) (g) | 4.46 | 5.29 | 6.13 | 8.64 | 12.77 | 16.93 | 21.08 |
| Mole fraction of OH groups reacted with IEM | 0 | 0.05 | 0.10 | 0.25 | 0.50 | 0.75 | 1.00 |
| Calculated OH EW | 393 | 422 | 454 | 576 | 941 | 2037 | infinite |

The amount of IEM required to produce a specified mole fraction of OH groups reacted with IEM was determined as follows. The copolymer batch contained 37.07 g hydroxybutyl acrylate or 0.2571 mol hydroxyl groups (37.07 g/144.17 g/mol). One-eighth of the batch contained 37.63 g of solution (301 g/8). Each 37.63 g of solution contained 0.03214 (0.2571/8) moles of hydroxyl groups. For Example 16, the mole fraction of OH groups reacted with IEM was 0.05. The number of moles of IEM required to achieve this was determined as 0.05 times 0.03214 moles, which gives $1.607 \times 10^{-3}$ moles of IEM. Since the molecular weight of IEM is 155.15, the required mass of IEM was $1.607 \times 10^{-3}$ moles times 155.15 g/mole or 0.25 grams. The OH Equivalent Weight (EW) was calculated as mass of solids in the solution divided by the number of moles of OH that was not reacted with IEM. For Example 16, the number of moles of OH that was not reacted with IEM was 0.03053 (0.0321 times 0.95) and the total mass of solids was 12.88 grams, so the OH EW was 422 (12.88/0.03053). The other examples were determined similarly. For Example C2 where all hydroxyl groups were reacted with IEM, the amount of IEM required was 4.99 g (0.03214 moles times 155.15 g/mol).

For the hydroxybutyl acrylate units unreacted with IEM the formula for those units is:

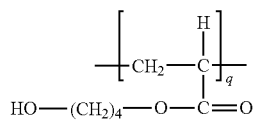

For the hydroxybutyl acrylate units reacted with IEM the formula for those units is:

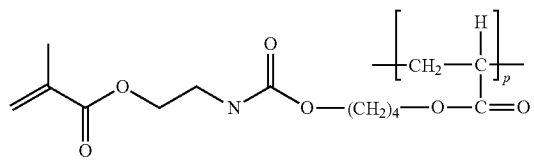

The HFPO copolymers described above were used to make coating solutions in the same manner and proportions as described in Examples 1-15. The coated solutions were then used to make coated films as described in Examples 1-15. The Fingerprint Test and the Cellulose Haze Test were performed on the samples. The initial fingerprint (Initial FP), the ratio of the fingerprint after 20 minutes to the initial fingerprint (FPR), the cellulose haze and the background haze are reported in the table below.

| Example | Initial FP | FPR | Cellulose Haze | Background Haze |
|---|---|---|---|---|
| C1 | 9.8 | 0.84 | 2.5 | 0.3 |
| 16 | 9.4 | 0.53 | 1 | 0.3 |
| 17 | 10.1 | 0.47 | 3 | 0.3 |
| 18 | 11.2 | 0.42 | 2.1 | 0.3 |
| 19 | 9.9 | 0.39 | 46 | 0.3 |
| 20 | 9.9 | 0.35 | 45 | 0.3 |
| C2 | 11.1 | 0.38 | 51 | 0.3 |

Examples 21-32

Using the procedure described in Example 1, HFPO copolymers for each of Examples 21-32 were made by preparing a solution of the materials in the table below except for IEA with the addition of 25 parts EtOAc, 0.125 parts VAZO 67, 0.125 parts Dodecane-thiol The resulting solution was reacted with DBTDL and IEA as described in Example 1 with the weight parts IEA indicated in the table below. After the reaction was complete it was adjusted to 30% solids with 10.58 weight parts ethyl acetate. All parts are by weight of solution and all materials at 50% solids except VAZO 67, dodecane-thiol and IEA.

| Example | 21 | 22 | 23 | 24 | 25 | 26 | 27 | 28 | 29 | 30 | 31 | 32 |
|---|---|---|---|---|---|---|---|---|---|---|---|---|
| HFPO Acrylate | 20 | 20 | 20 | 20 | 20 | 20 | 20 | 20 | 20 | 20 | 20 | 20 |
| B-CEA Glycidol 1.42 | 10 | | | | | | | | 10 | 10 | 10 | 10 |
| Hydroxybutyl acrylate | | 15 | 15 | 15 | 15 | 15 | 15 | 15 | | | | |
| Dodecanol-IEA | 20 | 15 | | | | | | | | | | |
| Hexanol-IEA | | | 15 | | | | | | 20 | | | |
| Guerbet C18 alcohol-IEA | | | | 15 | | | | | | 20 | | |
| Lauryl acrylate (SR 335) | | | | | 15 | | | | | | 20 | |
| Guerbet C18 acrylate | | | | | | 15 | | | | | | |
| Octadecyl (C18) acrylate (ODA) | | | | | | | 15 | | | | | |
| Octadecyl (C18) methacrylate (ODMA) | | | | | | | | 15 | | | | 20 |
| IEA | 0.5 | 0.5 | 0.5 | 0.5 | 0.5 | 0.5 | 0.5 | 0.5 | 0.5 | 0.5 | 0.5 | 0.5 |

The HFPO copolymers in the above table were used to make coating solutions in the same manner and proportions as described in Examples 1-15. The coated solutions were then used to make coated films as described in Examples 1-15. The Fingerprint Test and the Cellulose Haze test were performed on the samples. The background haze, the cellulose haze and the ratio of the fingerprint after 20 minutes to the initial fingerprint are reported in the table below. For Examples 21 and 22, samples were made from two separate batches (labeled Examples 21a and 21b for the two samples for Example 21 and labeled 22a and 22b for the two samples of Example 22).

| Example | Haze | Cellulose Haze | FPR |
|---|---|---|---|
| 21a | 0.24 | 1.0 | 0.25 |
| 21b | 0.24 | 1.6 | 0.28 |
| 22a | 0.21 | 7.7 | 0.35 |
| 22b | 0.21 | 0.7 | 0.33 |
| 23 | 0.2 | 1.5 | 0.23 |
| 24 | 0.23 | 1.1 | 0.32 |
| 25 | 0.26 | 5.9 | 0.35 |
| 26 | 0.22 | 1.8 | 0.30 |
| 27 | 0.21 | 4.3 | 0.31 |
| 28 | 0.26 | 2.3 | 0.32 |
| 29 | 0.2 | 1.1 | 0.33 |
| 30 | 0.23 | 14 | 0.27 |
| 31 | 0.22 | 0.6 | 0.30 |
| 32 | 0.22 | 3.6 | 0.41 |

Examples 33-38

Using the procedure described in Example 1, HFPO copolymers for each of Examples 33-38 were made by preparing a solution of the materials in the table below except for IEM. The resulting solution was reacted with DBTDL and IEM as described in Example 1 except that IEM was used instead of IEA with the weight parts IEM indicated in the table below. All parts are by weight of solution and all materials at 50% solids except VAZO 67, dodecane-thiol and IEM. After the reaction was complete it was adjusted to 30% solids with 10.58 weight parts ethyl acetate.

| Example | 33 | 34 | 35 | 36 | 37 | 38 |
|---|---|---|---|---|---|---|
| HFPO Acrylate | 10 | 20 | 15 | 10 | 15 | 20 |
| Hydroxybutyl acrylate (HBA) | 5 | 5 | 25 | 15 | 15 | 15 |
| Lauryl acrylate (SR 335) | 35 | 25 | 10 | 25 | 20 | 15 |
| Butyl acrylate | | | | 25 | 20 | 15 |
| EtOAc | 25 | 25 | 25 | 25 | 25 | 25 |
| VAZO 67 | 0.125 | 0.125 | 0.125 | 0.125 | 0.125 | 0.125 |
| Dodecane-thiol | 0.125 | 0.125 | 0.125 | 0.125 | 0.125 | 0.125 |
| IEM | 0.5 | 0.5 | 0.5 | 0.5 | 0.5 | 0.5 |

The hydroxyl equivalent weight (OH EW) of the additives for Examples 33 and 34 were calculated in the following fashion. For each of Examples 33 and 34, hydroxybutyl acrylate made up 10% by weight of the monomers. Batches of the polymers of Examples 33 and 34 containing 25 g of monomers, each contained 2.5 g of hydroxybutyl acrylate (10% of 25 g is 2.5 g). Therefore each batch contained 2.5 g/144.17 g/mol (MW for hydroxybutyl acrylate)=0.01734 mol OH groups. Reacting each batch with 0.5 g (0.003223 mol) of IEM (MW 155.15) resulted in some of the OH groups being functionalized to provide curable functionality, leaving 0.01734−0.00322=0.01412 moles hydroxyl groups. The total weight of all material in the batches for Examples 33 and 34 that each contained 25 g of monomers was 25.75 g (25 g monomers, 0.125 g VAZO 67, 0.125 g dodecane thiol, and 0.5 g IEM). Thus the OH EW for the additives of Example 33 and 34 was 25.75 g/0.01412 mol OH=1823.7 g/mol.

The hydroxyl equivalent weight (OH EW) of additive 35 was calculated in the following fashion. For Examples 35, hydroxybutyl acrylate made up 50% by weight of the monomers. A batch of the polymers of Example 35 containing 25 g of monomers, contained 12.5 g of hydroxybutyl acrylate (50% of 25 g is 12.5 g). Therefore the batch contained 12.5 g/144.17 g/mol=0.0867 mol OH groups. Reacting with 0.5 g (0.003223 mol) of IEM (MW 155.15) resulted in some of the OH groups being functionalized to provide curable functionality. The total weight of all material in the batch containing 25 g of monomers was 25.75 g. Thus the OH EW for the additive of Example 35 was 25.75 g/0.083477 mol OH=308.5 g/mol.

Example 35 could alternatively be prepared by replacing hydroxybutyl acrylate with hydroxyethyl acrylate. In this case the OH EW could be calculated in the following fashion. For a batch of polymer with monomers weighing 25 g, there would be 12.5 g hydroxyethyl acrylate (50% of 25 is 12.5 g). This gives 12.5 g/116.12 g/mol (MW for hydroxyethyl acrylate)=0.1076 mol OH groups. Reacting with 0.5 g (0.003223 mol) of IEM (MW 155.15) results in some of the OH groups being functionalized to provide curable functionality. The total weight of all material in a batch containing 25 g of monomers is 25.75 g. Thus the OH EW for this additive is 25.75 g/0.104377 mol OH=246.7 g/mol.

The HFPO copolymers in the above table were used to make coating solutions in the same manner and proportions as described in Examples 1-15. The coated solutions were then used to make coated films as described in Examples 1-15. The Fingerprint Test and the Cellulose Haze Test were performed on the samples. Initial fingerprint (Initial FP), the ratio of the fingerprint after 20 minutes to the initial fingerprint (FPR), the cellulose haze and the background haze are reported in the table below.

| Example | Initial FP | FPR | Cell. Haze | Haze |
|---|---|---|---|---|
| 33 | 11.2 | 0.28 | 17 | 0.7 |
| 34 | 12.6 | 0.41 | 1.1 | 1 |
| 35 | 12.5 | 0.42 | 11.1 | 0.2 |
| 36 | 12.4 | 0.57 | 20 | 0.3 |
| 37 | 10.9 | 0.65 | 1.6 | 0.4 |
| 38 | 10.1 | 0.41 | 14.2 | 0.2 |

Examples 39-41 and Comparative Example C3

For Comparative Example C3, additive 5 of U.S. patent application Ser. No. 13/307,137 was used as the HFPO additive. For Example 39, the HFPO copolymer of Example 25 was used. For each of Examples 40 and 41, an HFPO copolymer was made by preparing a solution of the materials in the table below except for IEM as described in Example 1. The resulting solution was reacted with DBTDL and IEM as described in Example 1 except that IEM was used instead of IEA with the weight parts IEM indicated in the table below. After the reaction was complete it was adjusted to 30% solids with 10.58 weight parts ethyl acetate. All parts are by weight of solution and all materials at 50% solids except VAZO 67, dodecane-thiol and IEM.

| Example | 40 | 41 |
|---|---|---|
| HFPO Acrylate-50% solids in ethyl acetate | 25 | 23.54 |
| Hydroxybutyl acrylate-50% solids in ethyl acetate | 15 | 18.54 |
| Lauryl acrylate-50% solids in ethyl acetate | 10 | 7.93 |
| EtOAc | 25 | 25 |
| VAZO 67 | 0.125 | 0.125 |
| Dodecane-thiol | 0.125 | 0.125 |
| Isocyanatoethyl methacrylate (IEM) | 0.5 | 0.5 |

After formulation of the acrylate copolymers, coating formulations were prepared as in Example 1 and a number of formulations were machine coated. Sample formulations were slot-die coated using the following method: The liquid coating composition was coated onto 125 micron gauge (5 mil) polyester film using a slot-fed die coater at a wet coating thickness of approximately 23 microns at a web speed of approximately nine meters per minute (30 feet/minute) to provide a dry thickness of 15 microns. The coated web was dried by passing through a gap dryer (as described in U.S. Pat. Nos. 5,581,905; 5,694,701 and 6,134,808) set at approximately 60° C. (residence time in the gap dryer was approximately 20 seconds). Then the web was further dried by passing through a conventional drying oven set at 100° C. (oven residence time was approximately 40 seconds). The coating was cured inline on the polyester web using a Fusion Processor with a 600-watt H bulb (both available from Fusion UV Systems of Gainsburg, Md.). The cellulose haze test was performed after equilibrating at ambient conditions for 24, 48 and 168 hours after coating. The results are reported in the table below.

| Example | Haze | Cellulose Haze 24 Hours | Cellulose Haze 48 Hours | Cellulose Haze 168 hours |
|---|---|---|---|---|
| 39 | 0.59 | 0.9 | 1.1 | 3.5 |
| 40 | 0.59 | 7.3 | 1.7 | 2.1 |
| 41 | 0.62 | 17 | 27 | 29 |
| C3 | 0.61 | 56 | 78 | 74 |

C3 is the HFPO urethane acrylate of Additive 5 of U.S. patent application Pub. US2012/0154811.

Examples 42-49

Using the procedure described in Example 1, HFPO copolymers for each of Examples 42-49 were made by preparing a solution of the materials in the table below except for IEM. The resulting solution was reacted with DBTDL and IEM as described in Example 1 except that IEM was used instead of IEA with the weight parts IEM indicated in the table below. After the reaction was complete it was adjusted to 30% solids with 10.58 weight parts ethyl acetate. All parts are by weight of solution and all materials at 50% solids except VAZO 67, dodecane-thiol and IEM.

| Example | 42 | 43 | 44 | 45 | 46 | 47 | 48 | 49 |
|---|---|---|---|---|---|---|---|---|
| MeFBSEA | 20 | 15 | | | | | | |
| (FC)4-oligomer-IEA | | | 20 | 15 | | | | |
| MCR-C12-IEA (1000 MW Silicone) | | | | | 20 | 15 | | |
| MCR-C18-IEA (5000 MW Silicone) | | | | | | | 20 | 15 |
| Hydroxybutyl acrylate (HBA) | 15 | 15 | 15 | 15 | 15 | 15 | 15 | 15 |
| Lauryl acrylate (SR 335) | 15 | 20 | 15 | 20 | 15 | 20 | 15 | 20 |
| Ethyl acetate | 25 | 25 | 25 | 25 | 25 | 25 | 25 | 25 |
| VAZO 67 | 0.125 | 0.125 | 0.125 | 0.125 | 0.125 | 0.125 | 0.125 | 0.125 |
| Dodecane-thiol | 0.125 | 0.125 | 0.125 | 0.125 | 0.125 | 0.125 | 0.125 | 0.125 |
| IEM | 0.5 | 0.5 | 0.5 | 0.5 | 0.5 | 0.5 | 0.5 | 0.5 |

The HFPO copolymers in the above table were used to make coating solutions in the same manner and proportions as described in Examples 1-15. The coated solutions were then used to make coated films as described in Examples 1-15. The Fingerprint Test and the Cellulose Haze Test were performed on the samples. Initial fingerprint (Initial FP), the ratio of the fingerprint after 20 minutes to the initial fingerprint (FPR), the background haze and the cellulose haze are reported in the table below.

| Example | Initial FP | FPR | Haze | Cellulose Haze |
|---|---|---|---|---|
| 42 | 5.32 | 0.28 | 0.27 | 38.00 |
| 43 | 4.86 | 0.33 | 0.2 | 22.00 |
| 44 | 4.52 | 0.34 | 0.22 | 36.00 |
| 45 | 3.99 | 0.30 | 0.25 | 30.00 |
| 46 | 6.87 | 0.41 | 0.23 | 3.90 |
| 47 | 6.36 | 0.44 | 0.2 | 2.80 |
| 48 | 6.38 | 0.53 | 0.17 | 7.50 |
| 49 | 5.70 | 0.51 | 0.2 | 10.70 |

Examples 50-62

Using the procedure described in Example 1, HFPO copolymers for each of Examples 50-62 were made by preparing a solution of the materials in the tables below except for IEM. The resulting solution was reacted with DBTDL and IEM as described in Example 1 except that IEM was used instead of IEA with the weight parts IEM indicated in the tables below. After the reaction was complete it was adjusted to 30% solids with 10.58 weight parts ethyl acetate. All parts are by weight of solution and all materials at 50% solids except VAZO 67, dodecane-thiol and IEM.

| Example | 50 | 51 | 52 | 53 | 54 | 55 | 56 |
|---|---|---|---|---|---|---|---|
| HFPO acrylate | | | | 10 | | | |
| MeFBSEA | | | | | 10 | | |
| (FC)4-oligomer-IEA | | | | | | | |
| MCR-C18-IEA (5000 MW Silicone) | 10 | 7.5 | 10 | 10 | | | |
| C-3b | | | | | | 20 | 10 |
| KF-2001 | | | | | | | 20 |
| Hydroxybutyl acrylate | 20 | 22.5 | 15 | 15 | 15 | 20 | 15 |
| Lauryl acrylate (SR 335) | 20 | 20 | 15 | 15 | 15 | 20 | 15 |
| Ethyl acetate | 25 | 25 | 25 | 25 | 25 | 25 | 25 |
| VAZO 67 | 0.125 | 0.125 | 0.125 | 0.125 | 0.125 | 0.125 | 0.125 |
| Dodecane-thiol | 0.125 | 0.125 | 0.125 | 0.125 | 0.125 | 0.125 | 0.125 |
| IEM | 0.5 | 0.5 | 0.5 | 0.5 | 0.5 | 0.5 | 0.5 |

| Example | 57 | 58 | 59 | 60 | 61 | 62 |
|---|---|---|---|---|---|---|
| HFPO acrylate | | | | 10 | 10 | |
| MeFBSEA | | | | 10 | | 10 |
| (FC)4-oligomer-IEA | | | 10 | | 10 | 10 |
| MCR-C18-IEA (5000 MW Silicone) C-3b | | | 10 | | | |
| KF-2001 | 10 | 20 | | | | |
| Hydroxybutyl acrylate | 20 | 15 | 15 | 15 | 15 | 15 |
| Lauryl acrylate (SR 335) | 20 | 15 | 15 | 15 | 15 | 15 |
| Ethyl acetate | 25 | 25 | 25 | 25 | 25 | 25 |
| VAZO 67 | 0.125 | 0.125 | 0.125 | 0.125 | 0.125 | 0.125 |
| Dodecane-thiol | 0.125 | none | 0.125 | 0.125 | 0.125 | 0.125 |
| IEM | 0.5 | 0.5 | 0.5 | 0.5 | 0.5 | 0.5 |

The HFPO copolymers in the above table were used to make coating solutions in the same manner and proportions as described in Examples 1-15. The coated solutions were then used to make coated films as described in Examples 1-15. The Fingerprint Test and the Cellulose Haze Test were performed on the samples. Initial fingerprint (Initial FP), the ratio of the fingerprint after 20 minutes to the initial fingerprint (FPR), the background haze, the cellulose haze, the Steel Wool Durability Test results and are reported in the table below.

| Example | Initial FP | FPR | Haze | Cellulose haze | Steel Wool Durability 1-5, 5 best |
|---|---|---|---|---|---|
| 50 | 6.97 | 0.32 | 0.17 | 29 | 3 |
| 51 | 9.02 | 0.38 | 0.23 | 29 | 4 |
| 52 | 7.24 | 0.38 | 0.22 | 1.1 | 3 |
| 53 | 8.57 | 0.39 | 0.20 | 25 | 4 |
| 54 | 7.12 | 0.36 | 0.17 | 20 | 4 |
| 55 | 8.73 | 0.32 | 0.17 | 8.5 | 4 |
| 56 | 8.44 | 0.38 | 0.17 | 4.8 | 4 |
| 57 | 9.45 | 0.40 | 0.18 | 1 | 3 |
| 58 | 9.02 | 0.40 | 0.17 | .6 | 4 |
| 59 | 8.68 | 0.37 | 0.18 | 3.5 | 3 |
| 60 | 9.08 | 0.43 | 0.22 | 1.9 | 2 |
| 61 | 8.82 | 0.42 | 0.23 | 3.5 | 2 |
| 62 | 9.59 | 0.42 | 0.19 | 13 | 2 |

What is claimed is:

1. A coating composition comprising:
a polymerizable resin composition comprising at least one free-radically polymerizable monomer, oligomer, polymer, or mixture thereof;
a first non-ionic unpolymerizable surfactant having a hydrophilic lipophilic balance ranging from 2 to 6 and a second polymerizable surfactant wherein the first and the second surfactants are present at a total concentration of greater than 10 wt-% and no greater than 25 wt-% based on total weight of solids of the coating composition; and
an additive comprising a low surface energy group comprising a fluorinated or silicone moiety and hydroxyl groups wherein at least a portion of the hydroxyl groups are primary hydroxyl groups.

2. The coating composition of claim 1 wherein the additive is a free-radically polymerizable additive.

3. The coating composition of claim 2 wherein the free-radically polymerizable additive comprises at least one (meth)acrylate group.

4. The coating composition of claim 1 wherein the additive comprises a monovalent perfluoropolyether, perfluoroalkyl or silicone moiety.

5. The coating composition of claim 4 wherein the perfluoropolyether moiety is $F(CF(CF_3)CF_2O)_aCF(CF_3)$— wherein a ranges from 4 to 15.

6. The coating composition of claim 5 wherein the additive comprises a monovalent polyorganosiloxane.

7. The coating composition of claim 1 wherein the concentration of hydroxyl groups of the additive ranges from about 200 to 2000 equivalent weight.

8. The coating composition of claim 1 wherein the additive comprises a polyacrylate backbone.

9. The coating composition of claim 1 wherein the additive has the general formula:

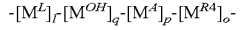

wherein
$[M^L]$ represent units derived from one or more ethylenically unsaturated monomers comprising a low surface energy silicone or fluorinated group;
$[M^{OH}]$ represent units derived from one or more ethylenically unsaturated monomers and at least one hydroxyl group;
$[M^A]$ represent units comprising a residue of $[M^{OH}]$ and a free-radically polymerizable group; and
$[M^{R4}]$ represent units derived from one or more ethylenically unsaturated monomers comprising an alkyl group.

10. The coating composition of claim 9 wherein the additive may be represented by the general formula:

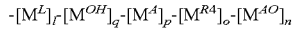

wherein $[M^{AO}]$ represents units derived from one or more ethylenically unsaturated monomers having the group R—(O—$R_a)_j$ wherein R is an alkyl group having greater than 6, 7, or 8 carbon atoms, Ra is independently an alkylene group $C_xH_{2x}$ where x=2 to 4, and j ranges from 1 to 50.

11. The coating composition of claim 1 wherein the unpolymerizable non-ionic surfactant comprises an alkyl or alkenyl group having at least 12 carbon atoms.

12. The coating composition of claim 1 wherein the composition comprises a polymerizable non-ionic surfactant having a hydrophilic lipophilic balance ranging from 2 to 13.

13. The coating composition of claim 1 wherein the polymerizable resin comprises at least one non-fluorinated binder precursor comprising at least two free-radically polymerizable groups.

14. The coating composition of claim 1 wherein the coating composition further comprises inorganic oxide nanoparticles.

15. An article comprising the cured coating composition of claim 1.

* * * * *

UNITED STATES PATENT AND TRADEMARK OFFICE
CERTIFICATE OF CORRECTION

| | | |
|---|---|---|
| PATENT NO. | : 9,441,135 B2 | |
| APPLICATION NO. | : 14/381382 | |
| DATED | : September 13, 2016 | |
| INVENTOR(S) | : Thomas Klun | |

It is certified that error appears in the above-identified patent and that said Letters Patent is hereby corrected as shown below:

In the Specification

Column 2
Line 47, Delete "fluororinated" and insert -- fluorinated --, therefor.

Column 5
Line 31, After "described" insert -- . --.

Column 6
Line 66, Delete "isocyantoalkyl" and insert -- isocyanatoalkyl --, therefor.

Column 11

Lines 15-20, Delete " " and insert --  --, therefor.

Column 16
Line 34 (Approx.), Delete "fluororinated" and insert -- fluorinated --, therefor.
Line 48 (Approx.), Delete "ore" and insert -- or --, therefor.

Lines 54-60, Delete " " and insert --  --, therefor.

Column 17
Line 10, Delete "perfluororalkyl" and insert -- perfluoroalkyl --, therefor.
Line 10, Delete "perfluororpolyether" and insert -- perfluoropolyether --, therefor.
Lines 22-23, Delete "perfluororpolyether" and insert -- perfluoropolyether --, therefor.

Signed and Sealed this
Eighteenth Day of April, 2017

Michelle K. Lee
*Director of the United States Patent and Trademark Office*

CERTIFICATE OF CORRECTION (continued)
U.S. Pat. No. 9,441,135 B2

Column 18
Line 45, Delete "glyceral" and insert -- glycerol --, therefor.
Line 61, Delete "and or" and insert -- and/or --, therefor.

Column 20
Line 57, Delete "mere aptopropyltrimethoxysilane," and insert -- mercaptopropyltrimethoxysilane, --, therefor.

Column 23
Line 25, After "solvent-based" insert -- . --.

Column 27
Lines 44-45, Delete "Chemocals," and insert -- Chemicals, --, therefor.

Column 29
Line 64, Delete "Polysiciences" and insert -- Polysciences --, therefor.

Column 32
Line 23, After "funnel" insert -- . --.
Line 28, Delete "flitted" and insert -- fritted --, therefor.

Column 33
Line 3, Delete "flitted" and insert -- fritted --, therefor.
Line 3, After "funnel" insert -- . --.

Column 35
Line 51, After "(40 ft/min)" insert -- . --.

Column 41
Line 2, Delete "Gainsburg," and insert -- Gaithersburg, --, therefor.